US009311349B2

(12) United States Patent
Herrnstadt

(10) Patent No.: US 9,311,349 B2
(45) Date of Patent: Apr. 12, 2016

(54) MULTIPLE DIMENSIONED DATABASE ARCHITECTURE USING SEMI-STRUCTURED DATA

(75) Inventor: Ori Herrnstadt, Boston, MA (US)

(73) Assignee: FoundationDB, LLC, McLean, VA (US)

( * ) Notice: Subject to any disclaimer, the term of this patent is extended or adjusted under 35 U.S.C. 154(b) by 0 days.

(21) Appl. No.: 13/153,407

(22) Filed: Jun. 4, 2011

(65) Prior Publication Data
US 2012/0036167 A1    Feb. 9, 2012

Related U.S. Application Data

(63) Continuation of application No. 11/970,251, filed on Jan. 7, 2008, now Pat. No. 8,150,850.

(51) Int. Cl.
*G06F 7/00* (2006.01)
*G06F 17/00* (2006.01)
*G06F 17/30* (2006.01)

(52) U.S. Cl.
CPC .... *G06F 17/30315* (2013.01); *G06F 17/30424* (2013.01); *G06F 17/30592* (2013.01)

(58) Field of Classification Search
CPC ............... G06F 17/30315; G06F 17/30424; G06F 17/30592
USPC .......... 707/769, 600–674, 790–812, 821–899
See application file for complete search history.

(56) References Cited

U.S. PATENT DOCUMENTS

| | | | | |
|---|---|---|---|---|
| 7,530,012 | B2 * | 5/2009 | Medicke et al. | 715/212 |
| 8,086,959 | B2 * | 12/2011 | Rothschiller et al. | 715/255 |
| 2002/0198726 | A1 * | 12/2002 | Kiernan et al. | 705/1 |
| 2003/0200224 | A1 * | 10/2003 | Zhang et al. | 707/102 |
| 2003/0212694 | A1 * | 11/2003 | Potapov et al. | 707/100 |
| 2006/0059197 | A1 * | 3/2006 | Furusho | 707/104.1 |
| 2007/0006071 | A1 * | 1/2007 | Erman | 715/513 |
| 2008/0046457 | A1 * | 2/2008 | Haub et al. | 707/102 |
| 2008/0046462 | A1 * | 2/2008 | Kaufman et al. | 707/102 |

OTHER PUBLICATIONS

Ailamaki et al., Weaving Relations for Cache Performance, 2001, pp. 1-12.*
Wong et al., Modelling and Manipulating Multidimensional Datain Semistructured Databases, 2001, pp. 14-21.*
Chang et al., Bigtable: A Distributed Storage System for Structured Data, 2006, pp. 1-14.*

* cited by examiner

*Primary Examiner* — Taelor Kim
(74) *Attorney, Agent, or Firm* — Downey Brand LLP

(57) ABSTRACT

A database management system stores data form a plurality of logical tables as independent copies in different format. In one specific example the system organizes tables into table groups and de-normalizes the table in each table group. It also organizes data in a second format including vertical column containers that store all the data for one attribute, there being one column container for each table and each attribute within that table. The receipt of a query causes the system to develop a query plan that can interact with either or both of the container sets.

17 Claims, 38 Drawing Sheets

```
SELECT tblCUSTOMER.FIRSTNAME, tblCUSTOMER.LASTNAME , tblITEM.SALE, tblBOOK.TITLE  ⎫ 51
                                                                                 ⎬
FROM  tblCUSTOMER, tblORDER, tblITEM, tblBOOK                                    ⎫ 52
                                                                                 ⎬
WHERE  tblCUSTOMER.CUSTOMERID = tblORDER.fkCUSTOMERID AND ——— 54   ⎫
       tblORDER.ORDERID = tblITEM.fkORDERID AND ——— 55              ⎬ 53
       tblBOOK.BOOKID = tblITEM.fkBOOKID AND ——— 56                 │
       tblCUSTOMER.CUSTOMERID = 20; ——— 57                         ⎭
```

Table 71A:

| CUSTOMERID | LASTNAME | FIRSTNAME | BIRTHDATE | GENDER | fkSTATE |
|---|---|---|---|---|---|
| 20 | APPLE | ADAM | 1/20/1965 | M | 12 |

Table 72A:

| CUSTOMERID | LASTNAME | FIRSTNAME | BIRTHDATE | GENDER | fkSTATE | ORDERID | ORDERDATE | STATUS |
|---|---|---|---|---|---|---|---|---|
| 20 | APPLE | ADAM | 1/20/1965 | M | 12 | 100 | 12/14/2006 | OPEN |
| 20 | APPLE | ADAM | 1/20/1965 | M | 12 | 102 | 5/6/2007 | BACK ORDER |

Table 73A:

| CUSTOMERID | LASTNAME | FIRSTNAME | BIRTHDATE | GENDER | fkSTATE | ORDERID | ORDERDATE | STATUS | ITEMID | fkBOOKID | SALE |
|---|---|---|---|---|---|---|---|---|---|---|---|
| 20 | APPLE | ADAM | 1/20/1965 | M | 12 | 100 | 12/14/2006 | OPEN | 4100 | 4 | $36.80 |
| 20 | APPLE | ADAM | 1/20/1965 | M | 12 | 100 | 12/14/2006 | OPEN | 4102 | 3 | $66.00 |
| 20 | APPLE | ADAM | 1/20/1965 | M | 12 | 102 | 5/6/2007 | BACK ORDER | 4013 | 1 | $13.60 |

FIG. 3D
PRIOR ART

Table 74A:

| CUSTOMERID | LASTNAME | FIRSTNAME | BIRTHDATE | GENDER | fkSTATE | ORDERID | ORDERDATE | STATUS | ITEMID | fkBOOKID | SALE | fkAUTHORID | TITLE | LIST | PUBLISHED | DESCRIPTION |
|---|---|---|---|---|---|---|---|---|---|---|---|---|---|---|---|---|
| 20 | APPLE | ADAM | 1/20/1965 | M | 12 | 100 | 12/14/2006 | OPEN | 4100 | 4 | $36.80 | 245 | TITLE-1 | $46.00 | 4/5/1968 | FICTION |
| 20 | APPLE | ADAM | 1/20/1965 | M | 12 | 100 | 12/14/2006 | OPEN | 4102 | 3 | $66.00 | 200 | TITLE-35 | $76.00 | 5/6/1978 | NEWS |
| 20 | APPLE | ADAM | 1/20/1965 | M | 12 | 102 | 5/6/2007 | BACK ORDER | 4013 | 1 | $13.60 | 200 | TITLE-99 | $17.00 | 10/28/1980 | FICTION |

Table 75A:

| LASTNAME | FIRSTNAME | SALE | TITLE |
|---|---|---|---|
| APPLE | ADAM | $36.80 | TITLE-1 |
| APPLE | ADAM | $66.00 | TITLE-35 |
| APPLE | ADAM | $13.60 | TITLE-99 |

```
SELECT   tblSTATE.STATECODE, Avg(tblBOOK.LIST-tblITEM.SALE) AS DISCOUNT

FROM     tblCUSTOMER, tblORDER, tblITEM, tblBOOK, tblSTATE

WHERE    tblCUSTOMER.CUSTOMERID = tblORDER.fkCUSTOMERID AND
         tblBOOK.BOOKID = tblITEM.fkBOOKID AND
         tblORDER.ORDERID = tblITEM.fkORDERID AND
         tblSTATE.STATEID = tblCUSTOMER.fkSTATEID GROUP BY tblSTATE.STATECODE;
```

*FIG. 5A*
*PRIOR ART*

AUTHOR CLUSTER -- SAM JONES

AUTHOR CLUSTER ROW 182

| RID | CID | CLUSTER ROW TYPE | ATTRIBUTE BITMAP | PTR | LAST NAME | FIRST NAME | BIRTHDATE | CONTACT |
|---|---|---|---|---|---|---|---|---|
| 200 | 200 | TABLE AUTHOR | LASTNAME=1 FIRSTNAME=1 BIRTHDATE=1 CONTACT=1 | → | JONES | SAM | 5/3/1938 | XXX |

BOOK CLUSTER ROW 183

| RID | CID | CLUSTER ROW TYPE | ATTRIBUTE BITMAP | PTR | fkAUTHORID | TITLE | LIST | PUBLISHED | DESCRIPTION |
|---|---|---|---|---|---|---|---|---|---|
| 1 | 200 | TABLE BOOK | fkAUTHORID=1 TITLE=1 LIST=1 PUBLISHED=1 DESCRIPTION=1 | → | 200 | TITLE 99 | $17.00 | 10/28/1980 | FICTION |

BOOK CLUSTER ROW 184

| RID | CID | CLUSTER ROW TYPE | ATTRIBUTE BITMAP | PTR | fkAUTHORID | TITLE | LIST | PUBLISHED | DESCRIPTION |
|---|---|---|---|---|---|---|---|---|---|
| 3 | 200 | TABLE BOOK | fkAUTHORID=1 TITLE=1 LIST=1 PUBLISHED=1 DESCRIPTION=1 | → | 200 | TITLE 35 | $76.00 | 5/16/78 | NEWS |

*FIG. 12A*

AUTHOR CLUSTER -- BARBARA SMITH

AUTHOR CLUSTER ROW 185

| RID | CID | CLUSTER ROW TYPE | ATTRIBUTE BITMAP | PTR | LAST NAME | FIRST NAME | BIRTHDATE | CONTACT |
|---|---|---|---|---|---|---|---|---|
| 245 | 245 | TABLE AUTHOR | LASTNAME=1 FIRSTNAME=1 BIRTHDATE=1 CONTACT=0 | → | SMITH | BARBARA | 12/13/1930 | |

192　　　　　193

BOOK OBJECT 186

| RID | CID | CLUSTER ROW TYPE | ATTRIBUTE BITMAP | PTR | fkAUTHORID | TITLE | LIST | PUBLISHED | DESCRIPTION |
|---|---|---|---|---|---|---|---|---|---|
| 4 | 245 | TABLE BOOK | BOOKID=1 fkAUTHORID=1 TITLE=1 LIST=1 PUBLISHED=1 DESCRIPTION=1 | → | 245 | TITLE1 | $46.00 | 4/5/1968 | FICTION |

BOOK OBJECT 187

| RID | CID | CLUSTER ROW TYPE | ATTRIBUTE BITMAP | PTR | fkAUTHORID | TITLE | LIST | PUBLISHED | DESCRIPTION |
|---|---|---|---|---|---|---|---|---|---|
| 2 | 245 | TABLE BOOK | BOOKID=1 fkAUTHORID=1 TITLE=1 LIST=1 PUBLISHED=1 DESCRIPTION=1 | → | 245 | TITLE 20 | $20.00 | 4/5/1968 | BIOGRAPHY |

*FIG. 12B*

CUSTOMER CLUSTER --- ADAM APPLE

ORDER CLUSTER ROW 200

| RID | CID | CLUSTER ROW TYPE | ATTRIBUTE BITMAP | PTR | LAST NAME | FIRST NAME | BIRTHDATE | GENDER | fkSTATE |
|---|---|---|---|---|---|---|---|---|---|
| 20 | 20 | TABLE CUSTOMER | LAST NAME=1 FIRSTNAME=1 BIRTHDATE=1 GENDER=1 fkSTATE=1 | → | APPLE | ADAM | 1/20/1965 | M | 12 |

ORDER CLUSTER ROW 201

| RID | CID | CLUSTER ROW TYPE | ATTRIBUTE BITMAP | PTR | fkCUSTOMERID | ORDER DATE | STATUS |
|---|---|---|---|---|---|---|---|
| 100 | 20 | TABLE ORDER | fkCUSTOMERID=1 ORDERDATE=1 STATUS=1 | → | 20 | 12/14/2006 | OPEN |

ITEM CLUSTER ROW 203

| RID | CID | CLUSTER ROW TYPE | ATTRIBUTE BITMAP | PTR | fkORDERID | fkBOOKID | PRICE |
|---|---|---|---|---|---|---|---|
| 4100 | 20 | TABLE ITEM | fkORDERID=1 fkBOOKID=1 SALE=1 | → | 100 | 4 | $36.80 |

ITEM CLUSTER ROW 204

| RID | CID | OBJECT TYPE | ATTRIBUTE BITMAP | PTR | fkORDERID | fkBOOKID | PRICE |
|---|---|---|---|---|---|---|---|
| 4102 | 20 | TABLE ITEM | fkORDERID=1 fkBOOKID=1 SALE=1 | → | 100 | 3 | $66.00 |

*FIG. 12C*

CUSTOMER CLUSTER -- BONNIE BIRD

CUSTOMER CLUSTER ROW 206

| RID | CID | CLUSTER ROW TYPE | ATTRIBUTE BITMAP | PTR | LAST NAME | FIRST NAME | BIRTHDATE | GENDER | fkSTATE |
|---|---|---|---|---|---|---|---|---|---|
| 21 | 21 | TABLE CUSTOMER | LAST NAME=1 FIRSTNAME=1 BIRTHDATE=1 GENDER=1 fkSTATE=1 | → | BIRD | BONNIE | 4/10/1974 | F | 26 |

ORDER CLUSTER ROW 207

| RID | CID | CLUSTER ROW TYPE | ATTRIBUTE BITMAP | PTR | fkCUSTOMERID | ORDER DATE | STATUS |
|---|---|---|---|---|---|---|---|
| 101 | 21 | TABLE ORDER | fkCUSTOMERID=1 ORDERDATE=1 STATUS=1 | → | 21 | 4/6/2006 | DELIVERED |

ITEM CLUSTER ROW 208

| RID | CID | CLUSTER ROW TYPE | ATTRIBUTE BITMAP | PTR | fkORDERID | fkBOOKID | PRICE |
|---|---|---|---|---|---|---|---|
| 4101 | 21 | TABLE ITEM | fkORDERID=1 fkBOOKID=1 SALE=1 | → | 101 | 2 | $16.00 |

*FIG. 12E*

STATE CLUSTER ROW 210

| RID | CID | CLUSTER ROW TYPE | ATTRIBUTE BITMAP | POINTER | STATECODE | NAME |
|---|---|---|---|---|---|---|
| 12 | 12 | TABLE STATE | STATECODE=1 NAME=1 | ↑ | FL | FLORIDA |

STATE CLUSTER ROW 211

| RID | CID | CLUSTER ROW TYPE | ATTRIBUTE BITMAP | POINTER | STATECODE | NAME |
|---|---|---|---|---|---|---|
| 26 | 26 | TABLE STATE | STATECODE=1 NAME=1 | ↑ | MA | MASSACHUSETTS |

Table 273A:

| BOOKID | TITLE |
|---|---|
| 1 | TITLE-99 |
| 2 | TITLE-20 |
| 3 | TITLE-35 |
| 4 | TITLE-1 |

Table 272A:

| CUSTOMERID | LASTNAME | FIRSTNAME | BIRTHDATE | GENDER | fkSTATE | ORDERID | ORDERDATE | STATUS | ITEMID | fkBOOKID | SALE |
|---|---|---|---|---|---|---|---|---|---|---|---|
| 20 | APPLE | ADAM | 1/20/1965 | M | 12 | 100 | 12/14/2006 | OPEN | 4100 | 4 | $36.80 |
| 20 | APPLE | ADAM | 1/20/1965 | M | 12 | 100 | 12/14/2006 | OPEN | 4102 | 3 | $66.00 |
| 20 | APPLE | ADAM | 1/20/1965 | M | 12 | 102 | 5/6/2007 | BACK ORDER | 4013 | 1 | $13.60 |

Table 274A:

| CUSTOMERID | LASTNAME | FIRSTNAME | BIRTHDATE | GENDER | fkSTATE | ORDERID | ORDERDATE | STATUS | ITEMID | fkBOOKID | SALE | TITLE |
|---|---|---|---|---|---|---|---|---|---|---|---|---|
| 20 | APPLE | ADAM | 1/20/1965 | M | 12 | 100 | 12/14/2006 | OPEN | 4100 | 4 | $36.80 | TITLE-1 |
| 20 | APPLE | ADAM | 1/20/1965 | M | 12 | 100 | 12/14/2006 | OPEN | 4102 | 3 | $66.00 | TITLE-35 |
| 20 | APPLE | ADAM | 1/20/1965 | M | 12 | 102 | 5/6/2007 | BACK ORDER | 4013 | 1 | $13.60 | TITLE-99 |

Table 275A:

| LASTNAME | FIRSTNAME | SALE | TITLE |
|---|---|---|---|
| APPLE | ADAM | $36.80 | TITLE-1 |
| APPLE | ADAM | $66.00 | TITLE-35 |
| APPLE | ADAM | $13.60 | TITLE-99 |

```
<?xml version="1.0" encoding="ISO-8859-1"?>
<xs:schema xmlns:xs="http://www.w3.org/2001/XMLSchema">
                                                                    310
    <xs:element name="CustomerContainer" type="CustomerList"/>
                                                              311
    <xs:complexType name="CustomerList">
        <xs:sequence>
                                                                          313
            <xs:element name="Customer" minOccurs="0" maxOccurs="unbounded">
                <xs:complexType>
                    <xs:sequence>
                        <xs:element name="LastName" type="xs:string"/>
                        <xs:element name="FirstName" type="xs:string"/>
314                     <xs:element name="BirthDate" type="xs:date"/>
                        <xs:element name="Gender" type="xs:string"/>
                        <xs:element name="fkState" type="xs:positiveInteger"/>
                                                                                 315
                        <xs:element name="Order" minOccurs="0" maxOccurs="unbounded">
                            <xs:complexType>
                                <xs:sequence>
316                                 <xs:element name="OrderID" type="xs:positiveInteger"/>
                                    <xs:element name="fkCustomerID" type="xs:positiveInteger"/>
                                    <xs:element name="OrderDate" type="xs:date"/>
                                    <xs:element name="Status" type="xs:string"/>
                                                                                           317
                                    <xs:element name="Item" minOccurs="0" maxOccurs="unbounded">
                                        <xs:complexType>
                                            <xs:sequence>
318                                             <xs:element name="ItemID" type="xs:positiveInteger"/>
                                                <xs:element name="fkOrderID" type="xs:positiveInteger"/>
                                                <xs:element name="fkBookID" type="xs:positiveInteger"/>
                                                <xs:element name="Sale" type="xs:decimal"/>
                                            </xs:sequence>
                                        </xs:complexType>
                                    </xs:element>
                                </xs:sequence>
                            </xs:complexType>
                        </xs:element>
319     </xs:sequence>
        <xs:attribute name="CustomerID" type="xs:positiveInteger" use="required"/>
                    </xs:complexType>
                </xs:element>
            </xs:sequence>
        </xs:complexType>

</xs:schema>
```

FIG. 18

```xml
<?xml version="1.0" encoding="ISO-8859-1"?>

<CustomerContainer xmlns:xsi="http://www.w3.org/2001/XMLSchema">

<Customer CustomerID="20">
      <LastName>APPLE</LastName>
      <FirstName>ADAM</FirstName>
      <BirthDate>1965-01-20</BirthDate>
      <Gender>M</Gender>
      <fkState>12</fkState>
      <Order>
        <OrderID>100</OrderID>
        <fkCustomerID>20</fkCustomerID>
        <OrderDate>2006-12-14</OrderDate>
        <Status>OPEN</Status>
        <Item>
          <ItemID>4100</ItemID>
          <fkOrderID>100</fkOrderID>
          <fkBookID>300102</fkBookID>
          <Sale>36.80</Sale>
        </Item>
        <Item>
          <ItemID>4102</ItemID>
          <fkOrderID>100</fkOrderID>
          <fkBookID>250004</fkBookID>
          <Sale>66.00</Sale>
        </Item>
      </Order>
      <Order>
        <OrderID>102</OrderID>
        <fkCustomerID>20</fkCustomerID>
        <OrderDate>2007-05-06</OrderDate>
        <Status>BACK ORDER</Status>
        <Item>
          <ItemID>4013</ItemID>
          <fkOrderID>102</fkOrderID>
          <fkBookID>100600</fkBookID>
          <Sale>13.60</Sale>
        </Item>
      </Order>
    </Customer>

<Customer CustomerID="21">
      < ... >
    </Customer>

</CustomerContainer>
```

FIG. 19

MULTIPLE DIMENSIONED DATABASE ARCHITECTURE USING SEMI-STRUCTURED DATA

BACKGROUND OF THE INVENTION

1. Field of the Invention

The present invention relates generally to information processing systems, and, more specifically, to computer-implemented databases and database management systems (DBMS) that facilitate the storage of data in and the retrieval of data from a database.

2. Description of Related Art

Early simple database structures comprised a single file or table of multiple rows, or tuples, and columns. This format was particularly helpful when each row was unique; that is, no data was redundant. However, databases quickly became more complex. They began to include information in which each row was not unique. For example, consider a database containing information about authors and the books they write. If an author had written multiple books, each row in a simple database schema would include the author's name and one book's identification. So if an author wrote "n" books, the table would include "n" rows; and the author's name would appear in each of the "n" rows.

This repetition of the same value, such as the author's name, in multiple rows is characterized as "redundancy." Redundancy introduces certain problems. For example, storing redundant data consumes memory unnecessarily, and at the time memory was limited and expensive. That issue has become minimized over time. However, a problem that has not been minimized involves updates that change data and the need to maintain consistent data. If a database includes the authors and their addresses and one author's address changes, it is necessary to change that address in the record for each book that author wrote. If the update process is interrupted for any reason, some of that author's addresses might be changed and others might not. The resulting data would be inconsistent. Maintaining data consistency is a necessity with current databases.

Relational database management systems (RDBMS or "relational models") then were developed. These systems still serve as the basis for state of the art database management systems (DBMS). Introduced in the 1970s, the relational model pioneered data independence, supported by a formal algebra and an associated declarative query language known as Structured Query Language ("SQL"). In this language an "SQL query" or "query" is the primary tool for interacting with the data in the various tables.

Generally an RDBMS system stores data according to a relational storage schema in tables. Each table is stored as a sequential set of rows in data storage facilities, such as disks, main-memory and other memory. Many systems also implement indexes as additional data structures to enable fast random access to a specific row or rows. An index encodes a column or several columns (the key of the index) in a way that facilitates navigation to rows based on a key value. Each index entails an added cost of constructing and maintaining the index data structure if the data changes. The user, however, is presented with a non-redundant view of the data as tables and is generally unaware of this and other underlying redundancy.

Two other concepts also emerged during this development, namely: "normalization" and "relationships". "Normalization" minimizes redundancy by dividing the data into multiple tables. In the foregoing example, normalizing the single redundant author-book table produces individual author and book tables. The author table includes the information about each author one time; the book table, information about each book one time.

FIG. 1 discloses, in logical form, a simple normalized database 30 that records information about each author and book and information about each of a plurality of customers, their orders and the books associated with each order. The organization of this information will include analysis of the data information to define a "normalized" database with individual tables. One or more individual tables may be related. For example and for purposes of explanation assume, a database architect analyzes this data in FIG. 1 and arbitrarily defines three groups of related tables, such as an Author group 31, a Customer group 32 and a State group 33. The author group 31 contains all the information about authors and their books and includes an Author table 34 and a Book table 35. The customer group 32 relates to customers and their orders and includes a Customer table 36, an Order table 37 and an Item table 40. The State group 33 relates to state information and includes a State table 41. As will be apparent, the State group could comprise multiple tables, and the Item table 40 could be a member of the Author group 31.

Although FIG. 1 depicts relationships among these individual tables, the relationships are not explicitly defined. Rather, primary and foreign keys provide the information from which relationships can be defined. There are many field naming conventions, particularly with respect to naming primary and foreign keys. This discussion assumes that the prefix "fk" is added to the primary key name in one table to form the foreign key name in another related table. In this specific example, the Author table 34 includes an AUTHORID primary key field; the Book table 35, an fkAUTHORID foreign key field. Such a relationship is generally described as a one-to-many relationship because the same foreign key in multiple rows of the Book table 35 are related to each author. That is, a single, or "one," author is linked to one or more, e.g., "many", books the author has written. A link 42 in FIG. 1 represents at a logical level the relationship that the AUTHORID and fkAUTHORID fields define.

The Customer group 32 in FIG. 1 includes similar one-to-many relationships defined by link 43 and link 46. Two links 44 and 45 define relationships between tables in different groups. The link 44 links a table in the Author group 31 to a table the Customer group 32. Specifically, the Item table 40 has fkORDERID and fkBOOKID foreign keys. The fkORDERID foreign key links one item to one order. The fkBOOKID foreign key links one item to one book. The link 45 defines the relationship between the Customer table 36 and the State table 41 with the fkSTATEID field in the Customer table 36 linking to the STATEID field in the State table 41.

While FIG. 1 depicts each table with some representative fields, also called "attributes," FIG. 2 depicts the tables in a datasheet view with rows, columns and representative data. Each table has a primary key; some have a foreign key. More specifically, the Author table 34 contains the AUTHORID primary key plus attributes for an author's last name, first name, birth date and optional contact information. The Book table 35 the BOOKID primary key, the fkAUTHORID foreign key and attributes for the title, list price (LIST), publication date (PUBLISHED) and description. It is assumed for purposes of this discussion that each book is written by only one author. The organization of the remaining tables and attributes will be apparent to those of ordinary skill in the art.

An SQL query requests information from a database and creates a "resultset" of the requested information. A "resultset" is an object that holds a copy of data in memory and is disconnected from the data source. The most common SQL query or command retrieves data and is performed with a declarative SELECT keyword and several optional keywords and clauses, including FROM, WHERE, GROUP BY, HAVING, and ORDER BY clauses. The response to any query must retrieve each identified table individually from different file locations and then match the corresponding rows from the different tables according to the relationship.

The contents of the WHERE clause explicitly define each relationship that is relevant to the request and provides "denormalization" information that serves as the basis for a "join" operation. The WHERE clause specifically defines the tables to be joined and the fields or attributes that provide the relationship. For example, a WHERE clause that is to define the relationship between the Author and Book tables 34 and 35 will identify the Author table 34 and the AUTHORID primary key and the Book table 35 and the fkAUTHORID foreign key. That is, the execution of that WHERE clause joins the two tables using the AUTHORID primary key and the fkAUTHORID foreign key to reproduce the original data where each row would include the author's information and one book identification. A query response must process one join operation for each relationship that needs to be resolved.

It is difficult to execute join operations efficiently. Such inefficiencies are tolerable in relatively small databases, such as shown in FIGS. 1 and 2. However, real databases are becoming increasingly complex. A customer entity may include many levels of information including orders, items, addresses, phones, interaction history and links to other family members. Normalization places each level of information in a dedicated table. The relationships that exist when a database has many tables with a complex relationship increase the number of joins. The cumulative effect of join operation inefficiencies in databases of a size and complexity that are orders of magnitude greater than databases such as shown in FIGS. 1 and 2 can not be tolerated.

Normally a database is stored and processed in data storage facilities comprising disks, main-memory, cache and other memory individually or in combination. Each such memory has latency characteristics. Generally "latency" is the time that elapses between a request for data and the beginning of the actual data transfer. Disk delays, for example have three components, namely: seek time, rotational latency, and transfer rate. Seek time is a measure of the time required for the disk heads to move to the disk cylinder being accessed. Rotational latency is a measure of the time required for a specific disk block to reach under the disk head, and transfer rate ("bandwidth") is a measure of the rate at which date passes under the disk head. For sequential accesses, the determination of seek and rotation times need only occur for the first data block.

Over time disk and memory bandwidth improvements have enabled very efficient sequential accesses, for both read and write operations. However, disk and memory latency times have not improved correspondingly, making random access very inefficient. The dramatic improvement in bandwidth compared with latencies means that sequential access is becoming much "cheaper" than random accesses. Moreover, the performance advantage of sequential over random access is increasing exponentially over time. Access to individual tables may require extensive random disk and memory accesses, particularly during join operations. Accessing all parts of a customer entity, each residing in a separate row in disparate tables, requires a large number of random accesses. This further increases the difficulty in efficiently executing join operations, as well as other query operations.

SQL queries are used in two groups of database interaction applications, namely: OLTP (OnLine Transaction Processing) and OLAP (OnLine Analytical Processing) originally called DSS (Decision Support System) applications. OLTP applications process online transactions. Information associated with such transactions can be efficiently added to or retrieved from single table, such as any one of those shown in FIG. 1 using conventional storage schema. However, as entities span more and more tables the added cost of join operations and random accesses makes such queries increasingly inefficient.

For small databases with simple relationships, OLAP application requests for information can be processed with reasonable efficiency. In complex databases, OLAP applications search, retrieve and aggregate data from only a few columns within tables containing many rows. Each table must be fully scanned for any dimension that is not indexed or any aggregate that is not pre-calculated. Consequently it is unlikely that any analytical query to a relatively complex relational database will produce a result dataset in any reasonable time.

For example, FIG. 3A depicts an OLTP query 50 that seeks to list the title and sale price for each book ordered by a given customer. A SELECT clause 51 defines a final result dataset for the first and last names of the selected customer from the Customer table 36, the book title from the Book table 35 and the sale price from the Item table 40 with one row for each item.

A FROM clause 52 identifies each table to be accessed during the execution of the SQL query 50. In this specific example, the tables are the Customer, Order, Item and Book tables 36, 37, 40 and 35, respectively.

A WHERE clause 53 identifies the rows to be retrieved from each table and establishes the joins. In this example, a first condition 54 requires the CUSTOMERID value in the Customer table 36 to be equal to the value in the fkCUSTOMERID field in the Order table 37. Conditions 55 and 56 establish similar relationships and joins between the ORDERID field in the Order table 37 and the value in the fkORDERID field in the Item table 40 and between the BOOKID value in the Book table 35 and the fkBOOKID field in the Item table 40. A final condition 57 establishes the criteria that the CUSTOMERID field in the Customer table 36 be equal to "20".

As known and shown logically in FIG. 4, a data processing system 58 responds to the receipt of an SQL query 50 to produce a final resultset by parsing, optimizing and executing the SQL query. A query parser 59 uses the information in a data dictionary 60 to convert each SQL query into a series of SQL classes. A query optimizer 61 generates a query plan in response to the SQL query and information from the query parser 59 and the data dictionary 60. An execution unit 62 processes the query plan and information from the data dictionary 60 and a data store 63 to produce a resultset.

Generally speaking a data dictionary comprises meta data with definitions and representations of data elements. Within the context of a DBMS, a data dictionary is a set of tables and views and holds information concerning the definition of data elements, user names, rows and privileges, schema objects, integrity constraints, stored procedures and triggers, general database structure and space allocation information. In this embodiment, the data dictionary 60 in FIG. 4 includes a set 64 of table entries. Each table entry in the set 64 includes a set 65 of attribute or field definitions. Each definition in the set 65 contains a set 66 of properties for each attribute or field.

A change log 67 facilitates the durability of all data insert, delete and update operations. As known, a change log, such as the change log 67, records any changes in any class of non-volatile storage devices such as disk or optical drives.

A database system may operate in any processing system and use any number of computers, processes, threads and the like. Each application may be replicated or instantiated multiple times to satisfy performance or other considerations. Moreover, different systems may process SQL queries in different ways. FIG. 3B depicts one such query plan 70 for the SQL query 50 in FIG. 3A; and FIG. 3C depicts the interim and final result sets that will be produced when the execution unit 62 processes the query plan 70. Referring to FIGS. 3B and 3C together, initially step 71 will define a first interim resultset 71A comprising the record in the Customer table 36 whose CUSTOMERID value is "20". This first resultset, in this particular example, will contain only one record from the Customer table 36. As will be apparent, such a selection could be made in response to name information, in this example customer Adam Apple, to obtain the CUSTOMERID value.

Step 72 represents a first join operation wherein the Order table 37 will be scanned to identify any orders corresponding to the CUSTOMERID=20. Thus, step 72 produces a second interim resultset 72A that will contain each record from Order table 37 that relates to Adam Apple, along with the customer data.

A second join operation 73 uses the ORDERID primary key value in the interim resultset 72A and the fkORDERID value in Item table 40 to identify those items which Adam Apple has placed an order. A third resultset 73A will be produced. A third join operation 74 will combine those rows to produce a resultset in step 73 with the corresponding books from the Book table 35 through the fkBOOKID foreign key value in the resultset of step 73A and the BOOKID primary key value in the Book table 35 to produce a fourth resultset 74A. A projection operation 75 will convert this fourth resultset 74A into a final resultset 75A which includes the customer's first and last names and the selling price and title for each book Adam Apple purchased as defined by the SQL query 50.

Although the desired outcome for the SQL query 50 in FIG. 3A is relatively simple, the system must access four different tables and process three join operations to re-assemble the customer entity and extract corresponding book titles. Additionally each part of the customer entity resides in a different table such that every order and every item must be accessed individually by means of inefficient random access.

As an example of a more analytical query, FIG. 5A depicts an SQL query 80 for obtaining an average cash discount on the books by state assuming that the book price and the item price differ. The SQL query 80 includes a SELECT statement 81 that identifies the two elements, namely: the state code and a calculated cash discount value. The discount value is established as the cash difference between the list book price recorded by the LIST attribute of the Book table 35 of FIG. 2 and the actual sale price recorded in by SALE attribute in the Item table 40. In this particular SQL query a FROM statement 82 identifies the Customer table 36, the Order table 37, the Book table 35 and the State table 41. The WHERE statement 83 establishes four conditions thereby to establish the appropriate relationships in the same manner as described with respect to FIG. 3A. The GROUPBY statement 84 directs the process to multiple columns to be grouped. This enables aggregate functions to be performed on multiple columns with one command. The final resultset produces a two-column report. One column contains a state name; the other, an average cash discount for all sales to customers in that state.

FIG. 5B depicts a process analogous to that shown in FIG. 3B for processing the SQL query 80 in FIG. 5A. In this example, the WHERE clause defines four joins that are necessary to produce the desired result. More specifically, a query plan 90 initially will identify the Customer table 36. A first join operation 91 will respond to a first element of the WHERE clause 83 in FIG. 5A to join the Customer table 36 and the Order table 37 on the CustomerID value. A second join operation 92 will join the data set produced by the operation 91 with the Item table 40. A third join operation 93 then will produce a resultset based upon the output of the join operation 92 and the corresponding values from the Book table 35. A final join operation 94 will combine the resultset produced the join operation 93 and the data in the State table 41. A projection operation 95 will generate the values for the state code, the book price and the item price. An aggregation operation 96 will generate the average of the discount price on the basis of the state codes and produce a resultset at 97. As will be apparent, once the query plan 90 is constructed, the execution unit 62 will process the query plan 90 and generates the specified resultsets.

Although the desired outcome for the SQL query 80 in FIG. 5A operates on only three columns and seems relatively simple, the system must process four join operations because the required data resides in five individual tables. Even a relatively efficient implementation of join operations can require significant system resources. As the size of the tables increases, join implementation also suffers. When large numbers of join operations must be handled, processing delays increase, sometimes to unacceptable levels. Notwithstanding these issues, most databases continue to store data in normalized tables that closely follow the relational logical data model, as multiple related tables consisting of sequential rows and attribute columns. The logical relationships between the tables do not generally affect the way the data is actually stored in the tables. The database system must execute joins to establish a relationship for all the tables and require a large number of random accesses to match related parts.

Another approach for storing the data in various tables such as those shown in FIGS. 1 and 2 recognizes the foregoing problems and proposes to store database tables by vertically positioning all columns of the table. This optimizes the data for retrieval when processing OLAP applications. For example, U.S. Pat. No. 5,794,229 (1998) to French discloses such a storage schema. This system uses a conventional logical relational database management system table such as shown in FIG. 1. Rather, rather than store the data in a conventional row structure, as shown in FIG. 2 of this specification, the system only stores data in columns by attribute name. Each column comprises a plurality of cells (i.e., a column value for a particular record) which are arranged on a data page in a contiguous fashion. In the context of FIG. 1 of this disclosure, each of the tables 34 through 37, 40 and 41 would be stored in a column configuration.

In response to a query that system analyzes only those columns of data which are of interest and uses an optimizer to select the join order of the tables. The system does not retrieve row-based data pages consisting of information which is largely not of interest to the query. The retrieved column-based pages will contain mostly, if not completely, the information of interest to the query. This allows greater block I/O transfers and consequently faster execution of OLAP type queries. The execution of each join operation may be improved, as only the data in the primary key and foreign key columns needs to be retrieved and joined. However, all columns need to be joined. Thus, the number of join operations grows according to the number of attributes, rather then the number of tables. Column-based systems work well only for low projectivity and low selectivity queries. Put another way, these systems are adapted for queries where only a few attributes are projected, and where the data from a large percentage of the rows is used. Executing a query that accesses many attributes per table would be highly inefficient, as it would be necessary to execute many joins for all the attributes in same table. Therefore, processing of even the simplest OLTP query will be highly inefficient. For example retrieving just one row from the customer table 36 in FIGS. 1 and 2 requires fetching seven attribute values, each located in different column.

U.S. Pat. No. 7,024,414 (2006) to Sah et al. also discloses the storage of column data. This system parses table data into columns of values. Each column is formatted into a data stream for transfer to a storage device as a continuous strip of data. Both single-column and multiple-column storage structures are disclosed. Each column is stored as a data stream as a continuous strip of compressed data without regard to a page size for the storage device.

These approaches offer benefits by optimizing storage for query processing with respect to usage patterns, such as OLAP applications that access a few complete columns of many rows. However, they handle OLTP queries inefficiently. Moreover, in order to assemble a single complete entity, each attribute must be retrieved from a separate binary table by way of random access. So systems that use horizontal storage schema handle OLAP queries inefficiently while systems that use vertical storage schema handle OLTP queries inefficiently.

An article titled "Weaving Relations for Cache Performance" (Ailamaki et al., Proc. $27^{th}$ VLDB Conf., Rome, 2001) describes still another alternative data storage schema. In a conventional N-ary Storage Model (NSM) rows of a data table are spread across pages in memory. The described Partition Attributes Across (PAX) system converts the data in each page into vertical partitions to improve cache utilization and performance. However, the row formatted data is lost; there is only one copy of the data. To reconstruct a row one needs to perform "mini-joins" among vertical partitions within the page containing the row. Mini-joins incur minimal costs because it does not have to look beyond one page. A query response requires the system to scan each page, and fetch, or retrieve, the vertical partition for each attribute the query defines. The rows or records that satisfy the conditions are identified and reconstructed. While this article describes performance enhancements due to this variation, any such system still must process all the joins that would be processed with a database stored according to the NSM schema. Additionally processing a single attribute still requires fetching and processing the complete set of pages in which rows of the data table exist.

One proposed approach to lower the cost of join operations is to answer queries using previously defined materialized views, rather than using the base tables. A materialized view represents a pre-computed query result that is stored as a concrete table, and may be updated from the original base tables from time to time. U.S. Pat. No. 6,510,422 (2003) to Galindo-Legaria et al., U.S. Pat. No. 6,850,933 (2005) to Larson et al., and U.S. Pat. No. 6,199,063 (2001) to Colby et al. disclose similar approaches to the use of materialized views for answering queries, also known as the "view-utilization" problem. That is, the approach is to reduce the number of required join operations to answer a given query by processing materialized views already stored in a joined format. U.S. Pat. No. 6,356,889 (2002) to Lohman et al., and U.S. Pat. No. 7,191,169 (2007) to Tao, present several approaches to the related "view-selection" problem where a set of views to be materialized is chosen such that the cost of evaluating a given set of queries is minimized and such that the views remain within a pre-defined storage space constraint. The materialized views approach can cut join operation costs for these joins that are materialized. However, this comes at a great cost of determining, maintaining and storing the set of views and limits its application to only the most resource intensive queries. Furthermore, because materialized views store data in a highly un-normalized form, they tend to consume a large amount of storage space making the problem even more acute.

Another article titled "A Case for Fractured Mirrors" (Ramamurthy et al., Proc. $28^{th}$ VLDB Conf., Hong Kong, 2002) describes a database mirroring storage schema in which data is stored in accordance with both the NSM model and a Decomposition Storage Model (DSM). Two disks are mirrored. In one approach a first disk stores the primary copy of data in the NSM format; the second disk stores the primary copy of data according to the DSM format. In another approach fragments of the data are stored across the two physical mirrors to achieve better load balancing between the two copies. For example, if the system includes data stored as NSM and DSM models, a first mirrored disk might store a first fragment NSM0 from the NSM model and a second fragment DSM1 from the DSM model. Conversely, the second mirrored disk would store a first fragment DSM0 from the DSM model and a second fragment NSM1 from the NSM model. While this system provides a duplicate copy of each storage fragment, its primary goal is to incorporate a mirroring schema that replaces other RAID mirroring schemas, and where different schemas are used for different purposes (one for OLAP type loads and the other for OLTP loads). This system must also process all the joins that would be processed with a database stored according to the NSM schema.

What is needed is a database management system that produces high throughput for complex databases and that optimizes the response to both OLTP and OLAP queries and can handle increasingly complex requests for information, increasingly complex data models, and increasingly large quantities of data. What is also needed is a database management system that minimizes the processing of joins, maximizes sequential access and minimizes random access operations in memory, particularly disk memory, while maintaining two complete copies of the data.

SUMMARY

Therefore it is an object of this invention to provide a database management system and methodology that provides high throughput.

Another object of this invention is to provide a database management system and methodology that stores table data in two dimensions or storage schemata for optimizing performance and throughput.

Yet another object of this invention is to provide a database management system and methodology by which table data is stored in data structures organized along two dimensions.

Yet still another object of this invention is to provide a database management system and methodology by which table data is stored in two data sets each of which is organized in a different manner thereby to enable sequential access for a particular usage pattern.

Still yet another object of this invention is to provide a database management system and methodology in which a first copy of data is stored in a modified row format and another copy of the data is stored in a column format.

Yet still another object of this invention is to provide a database management system and methodology by which a conventional query is converted into a query plan that determines whether to access a copy of the data in a modified row format or a copy of the data in a column format.

Still yet another object of this invention is to provide a database management system and methodology in which a copy of data is stored in a modified row format that embeds join information.

In accordance with a first aspect of this invention a database management system includes database storage for data of a logical database model comprising at least one table group wherein each table group includes one root table and at least one other table related thereto and wherein each logical table is characterized as having columns of attributes and rows of data. The database storage comprises first and second data stores. The first data store positions all the data in the database in a plurality of memory locations in a first dimension wherein each of the plurality memory locations includes all the data from one row of a root table and all the related data from the other tables in that table group relevant data that one root table row. This storage schema allows sequential access to all the data in that root table row and its related rows in the other related tables. The second data store positions all the data in the database in a plurality of memory locations in a second dimension wherein each memory location includes all the data from one of the attributes in the database and all the corresponding values thereby to allow sequential access to the data in each attribute.

In accordance with another aspect of this invention, data structures are generated for data contained in a logical database model with tables in different relationships and a data dictionary. Table groups are formed from the tables in the logical database based upon the data in the data dictionary including, for each table group, a root table and tables related thereto. A first data store unit is created for all table groups in which the data for the database is stored in a first dimension wherein each of a plurality of memory locations includes all the data from one row of the root table and relevant data from the related tables thereby to allow sequential access to all the data in that root table row and related table row. A second data store unit is created for storing the data in the database in a plurality of memory locations in a second dimension wherein each memory location includes all the data from an attribute in the database and all the corresponding values thereby to allow sequential access to the data in each attribute memory location.

In accordance with yet another aspect of this invention a query is made to a logical database with root and related tables in different relationships and a data dictionary that identifies each table and a table group for that table in the database. Each of the tables includes attributes in columns and data in rows. A first data store unit stores the data in the database in a first dimension wherein each of a plurality of memory locations includes all the data from one row of the root table and relevant data from the related tables. A second data store unit stores the data in the database in a plurality of memory locations in a second dimension wherein each memory location includes all the data from one of the attributes in the database and all the corresponding values. In response to the query the table groups and the tables in the query are identified. Parsing the query compares the tables in the table group as provided by the data dictionary to the identified query tables. A list of attributes in the query is extracted that are contained in tables that are common to the database and to the query. This information enables the identification of one of a plurality of processing options. During processing under the selected option an intermediate resultset is obtained that satisfies those portions of the query that related to the table group. A final resultset is obtained by combining the intermediate resultsets.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3A depicts a specific SQL query for retrieving data of interest from the system represented in FIGS. 1 and 2; FIGS. 3C and 3D collectively depict intermediate resultsets and a final resultset produced during the execution of the query plan of FIG. 3B;

FIG. 5A depicts another specific SQL query for retrieving data of interest from the system represented in FIGS. 1 and 2.

FIGS. 12 and 12A through 12F collectively disclose an implementation of the storage schema in FIG. 7 with the data shown in FIG. 2;

FIG. 15B depicts various resultsets that will be generated during the execution of the query of FIG. 3A;

FIG. 18 is an XML document that represents an alternative for producing the storage schemata of this invention; and FIG. 19 is an XML document that represents actual data from the database of FIG. 2 organized according to the information in FIG. 18.

DESCRIPTION OF ILLUSTRATIVE EMBODIMENTS

Figure 11A:
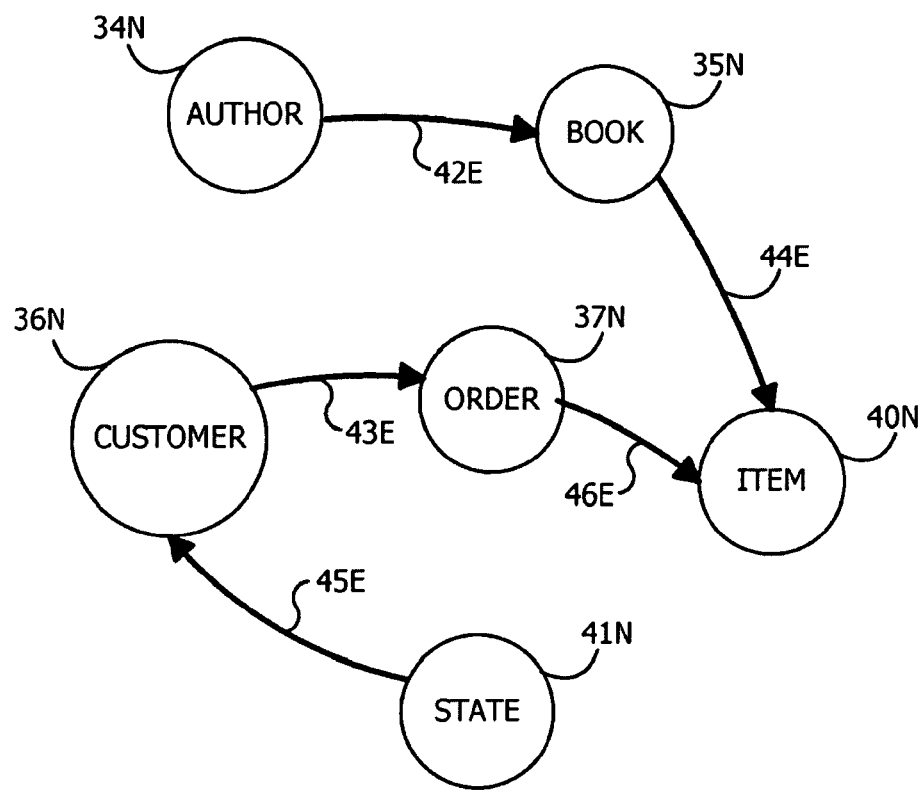
FIGS. 11A through 11E are state diagrams that are useful in understanding the process of FIGS. 10A and 10B.
Figure 12:
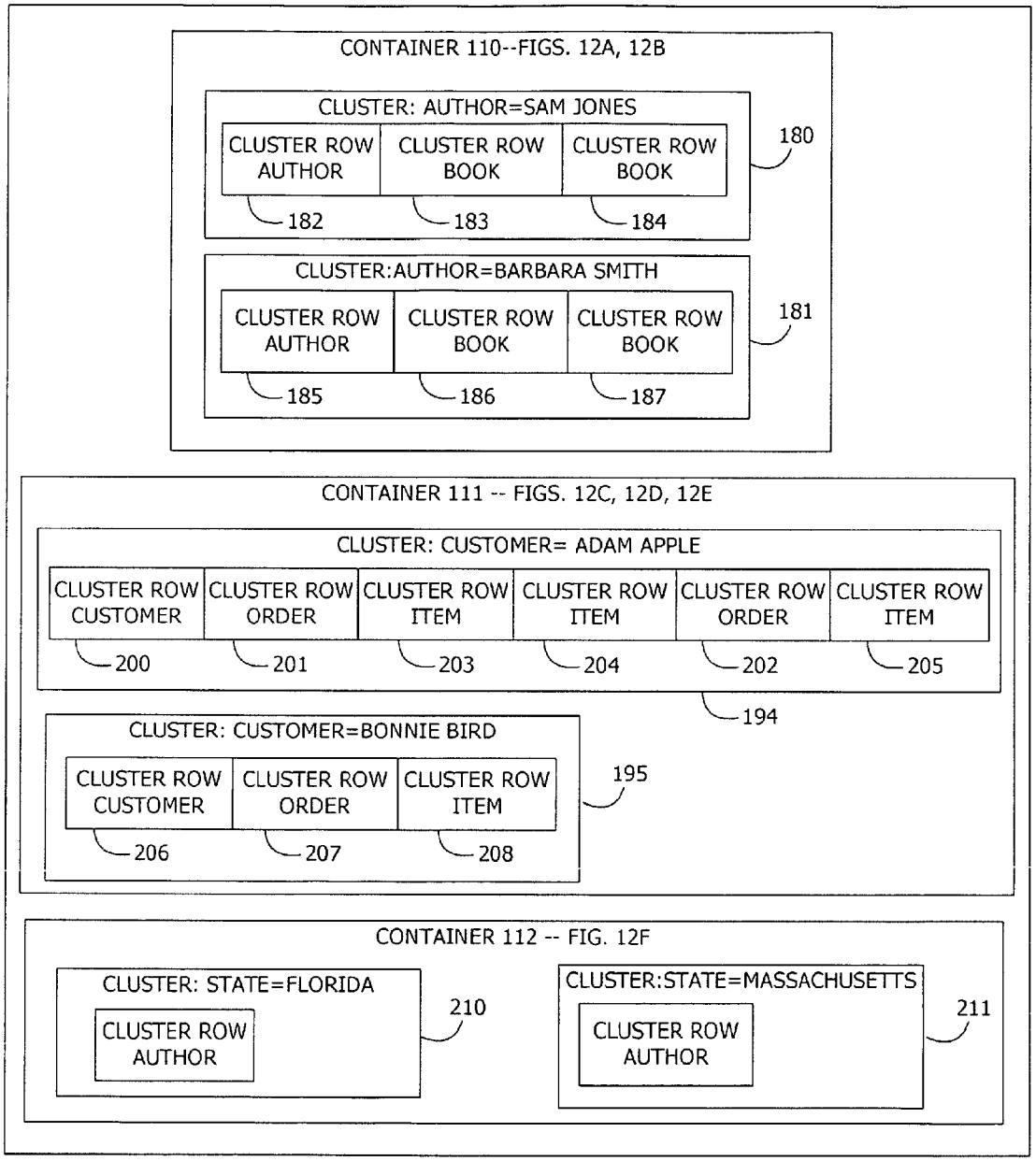
Figure 12D:
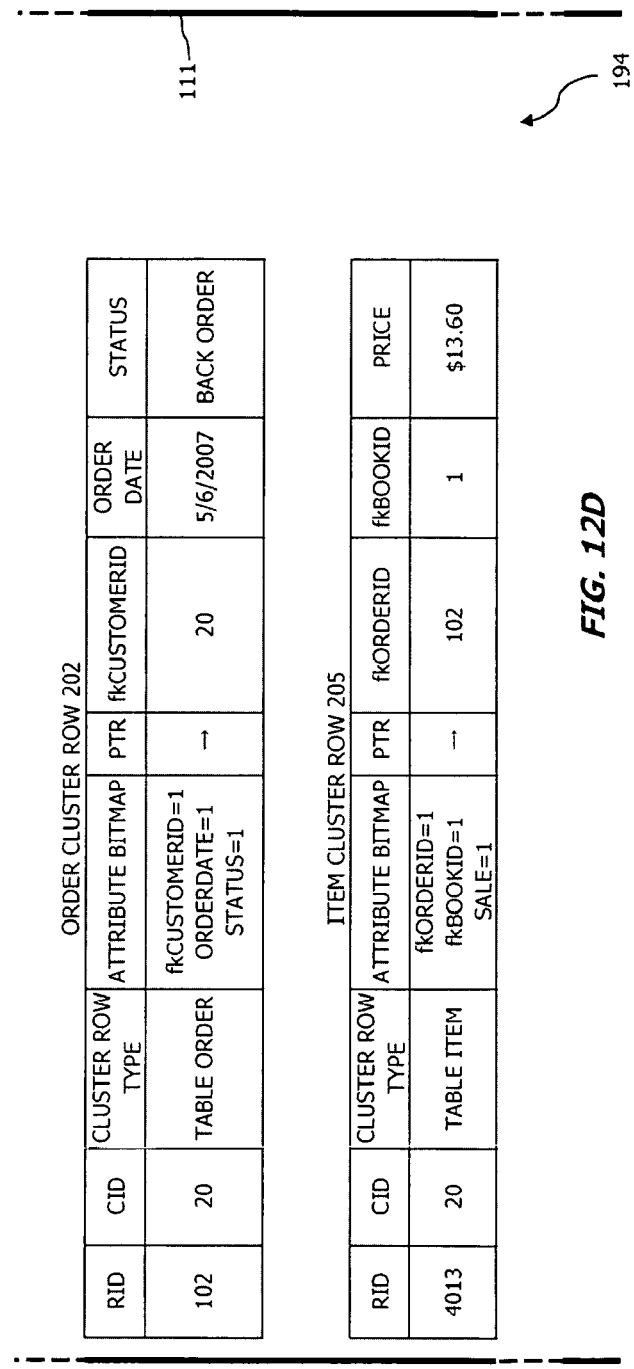
Figure 13:
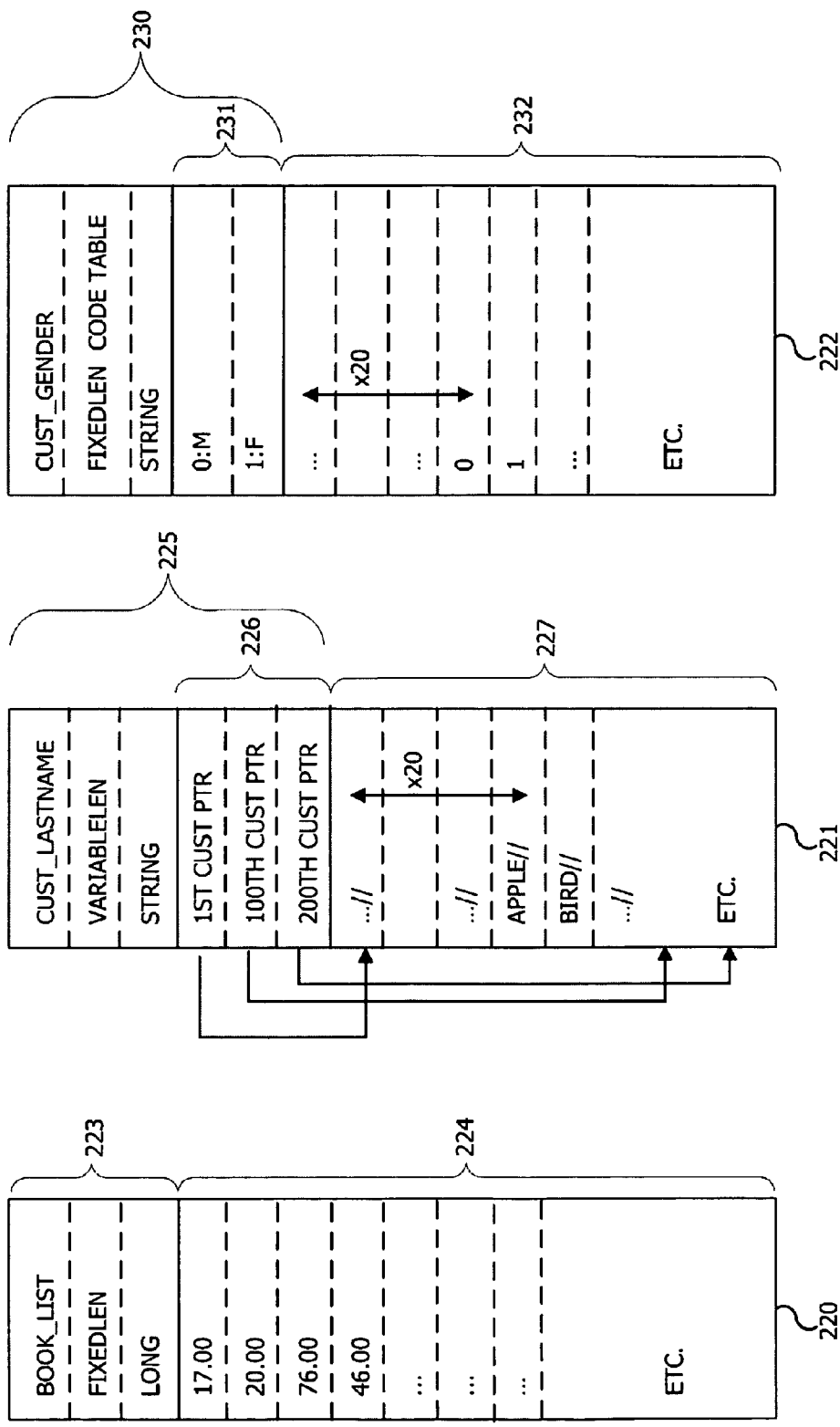
FIG. 13 discloses an implementation of the storage schema of FIG. 8 with the data shown in FIG. 2.
Figure 14:
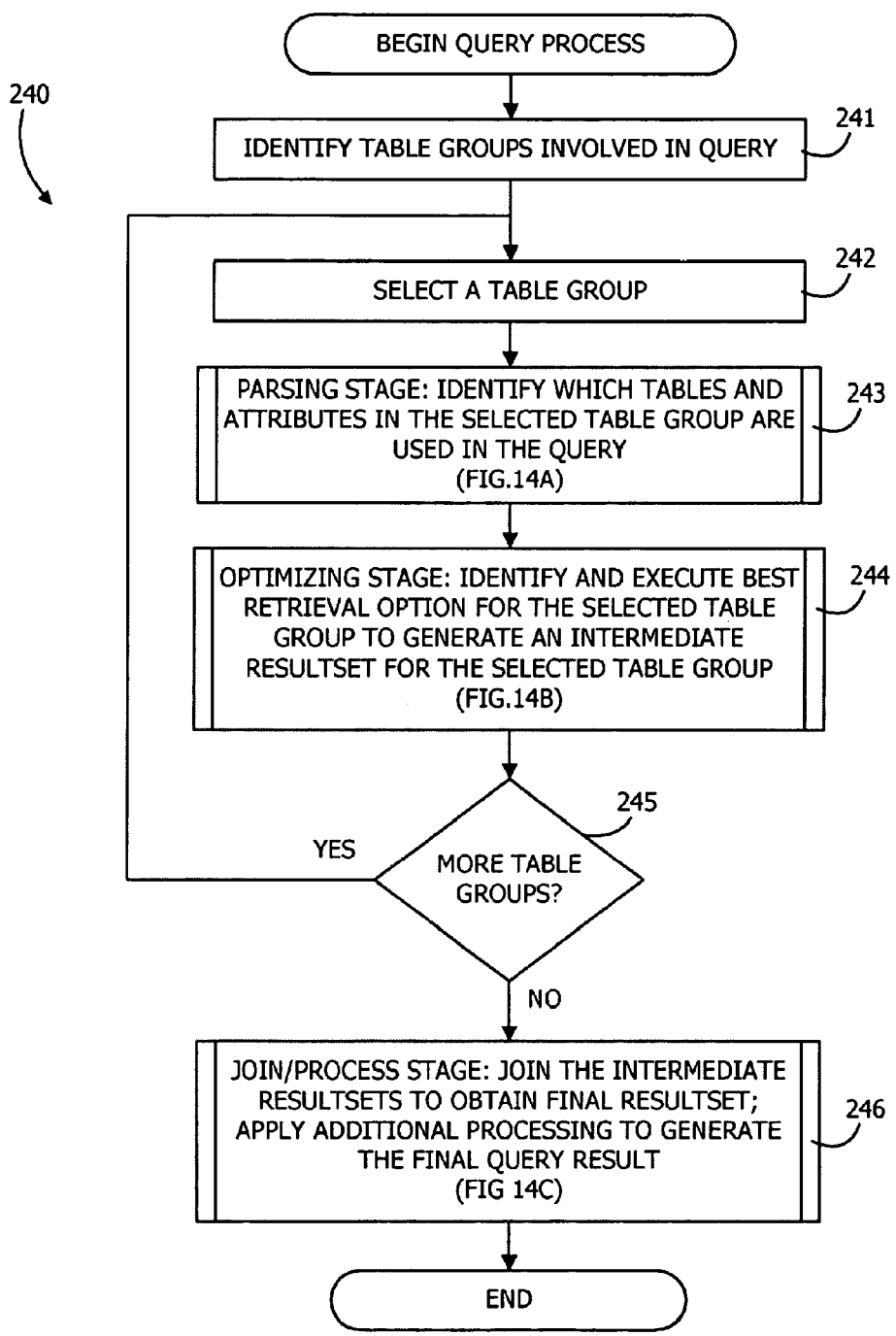
FIGS. 14, 14A, 14B and 14C depict a process for developing and executing a query plan that is useful in the database manager of this invention.

The foregoing description of the organization and operation of prior art database management systems will assist in understanding this invention and the advantages thereof. This invention can best be understood by first describing a logical representation of the basic architecture and storage schemata and then by describing schemata for a specific database and the process by which a query is processed. More specifically, FIGS. 6 through 11E present such a system at a logical level. FIGS. 12A through 13 depict a specific implementation of first and second storage schemata incorporating the data in FIG. 2. FIGS. 14 through 16 depict the process by which the system converts SQL queries shown in FIG. 3A into query plans. A description of a process for updating information in the database and alternate XML implementations follow in FIGS. 17 through 19.

Basic Architecture

Figure 4:
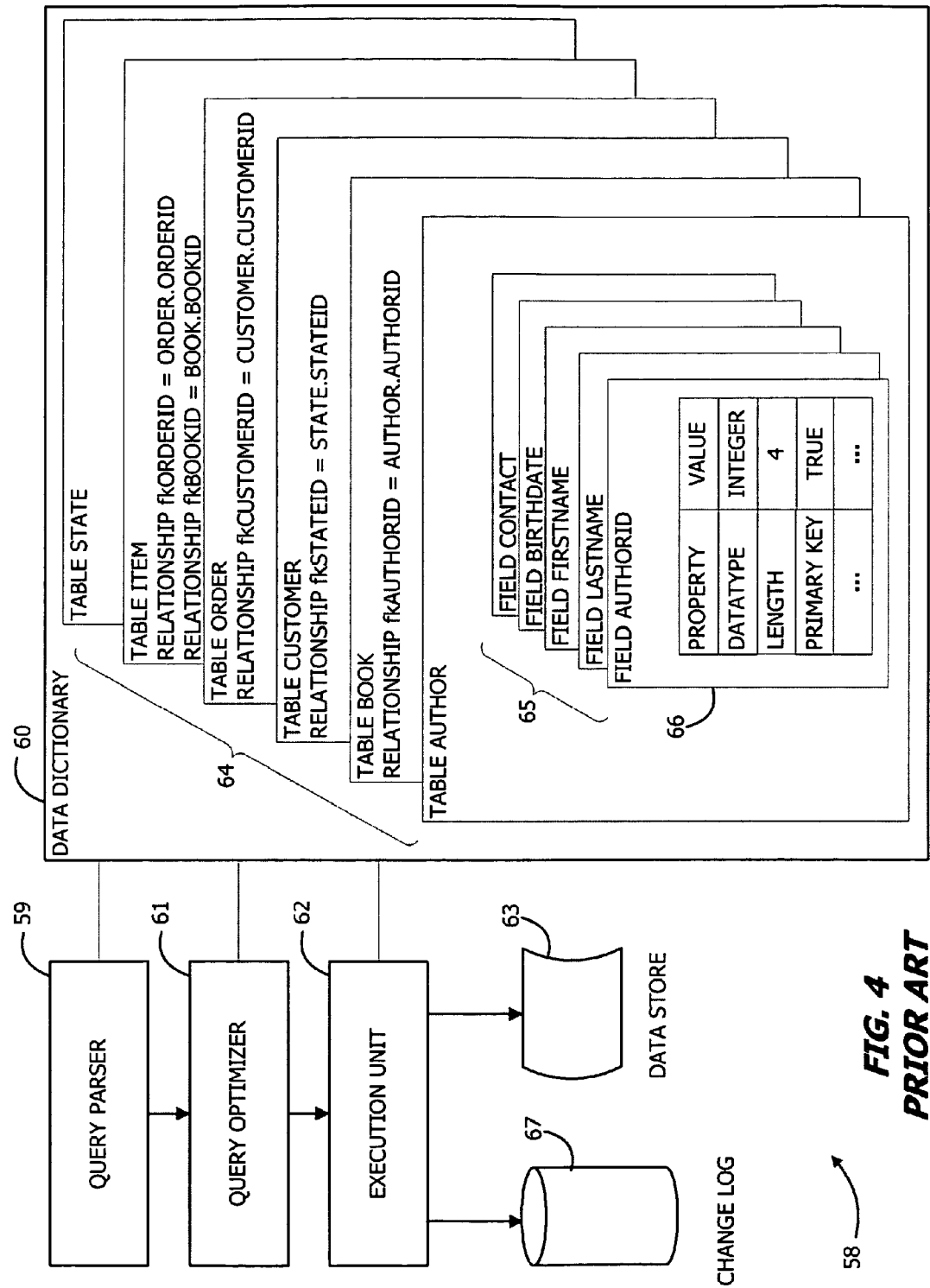
FIG. 4 is a functional block diagram that discloses a typical arrangement of system units for implementing a database according to the prior art.
Figure 6:
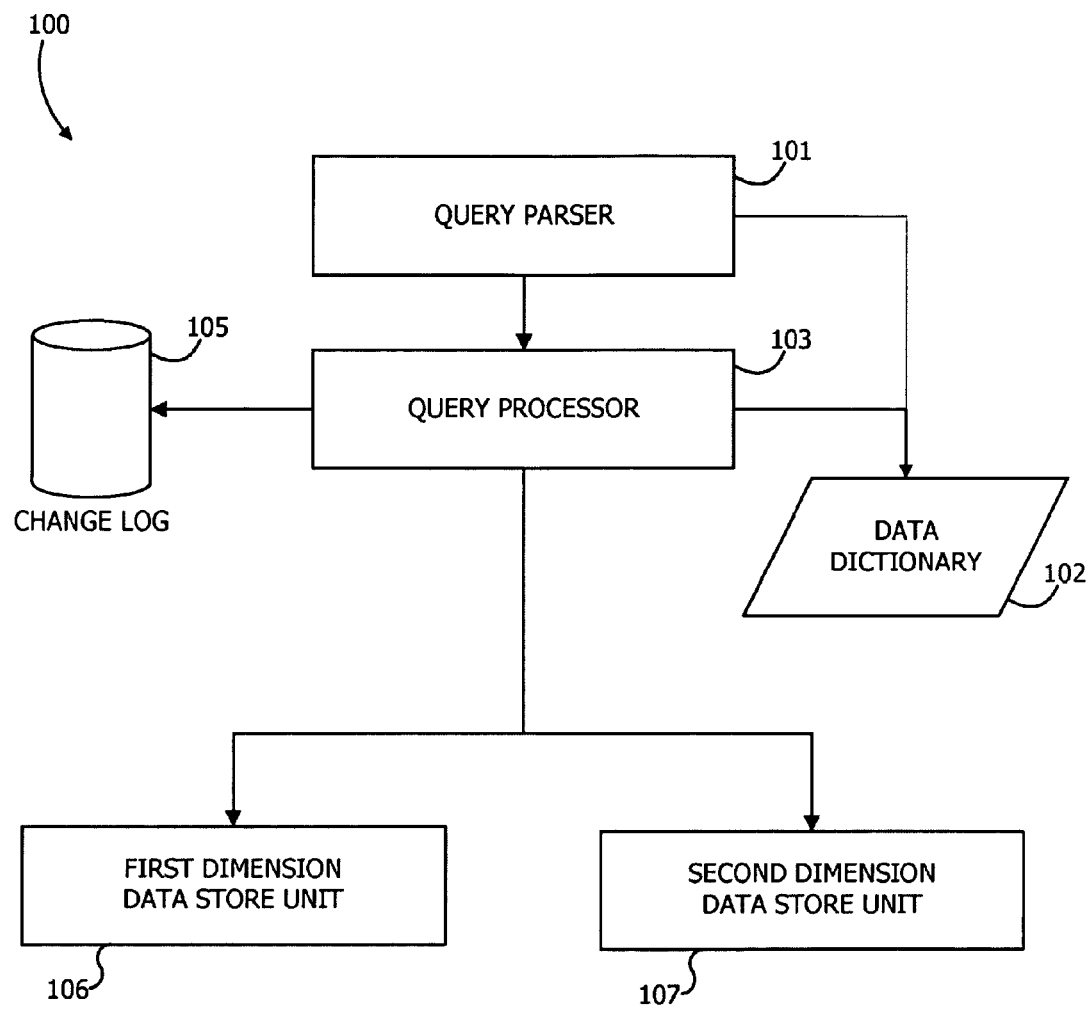
FIG. 6 is a functional block diagram that discloses one embodiment of system units for implementing this invention.

FIG. 6 is a functional block diagram of one implementation of a database management system 100 incorporating this invention. At this basic level the system 100 is similar to the system in FIG. 4 and includes, as components, a query parser 101, a data dictionary 102, a query processor 103 and a change log 105. As will become apparent, the specific implementation of each of these system components will vary with a specific implementation of this invention. Unlike the system in FIG. 4, in this embodiment the query processor 103 interacts with a first dimension data store unit 106, a second dimension data store unit 107 or both according to a query plan that the query processor 103 develops. Each of the first and second dimension data store units 106 and 107 stores all the data, but according to different storage schemata. Consequently, the invention provides data redundancy by maintaining two copies of the data, albeit according to different storage schemata.

First Dimension Data Store Unit 106

Figure 7:
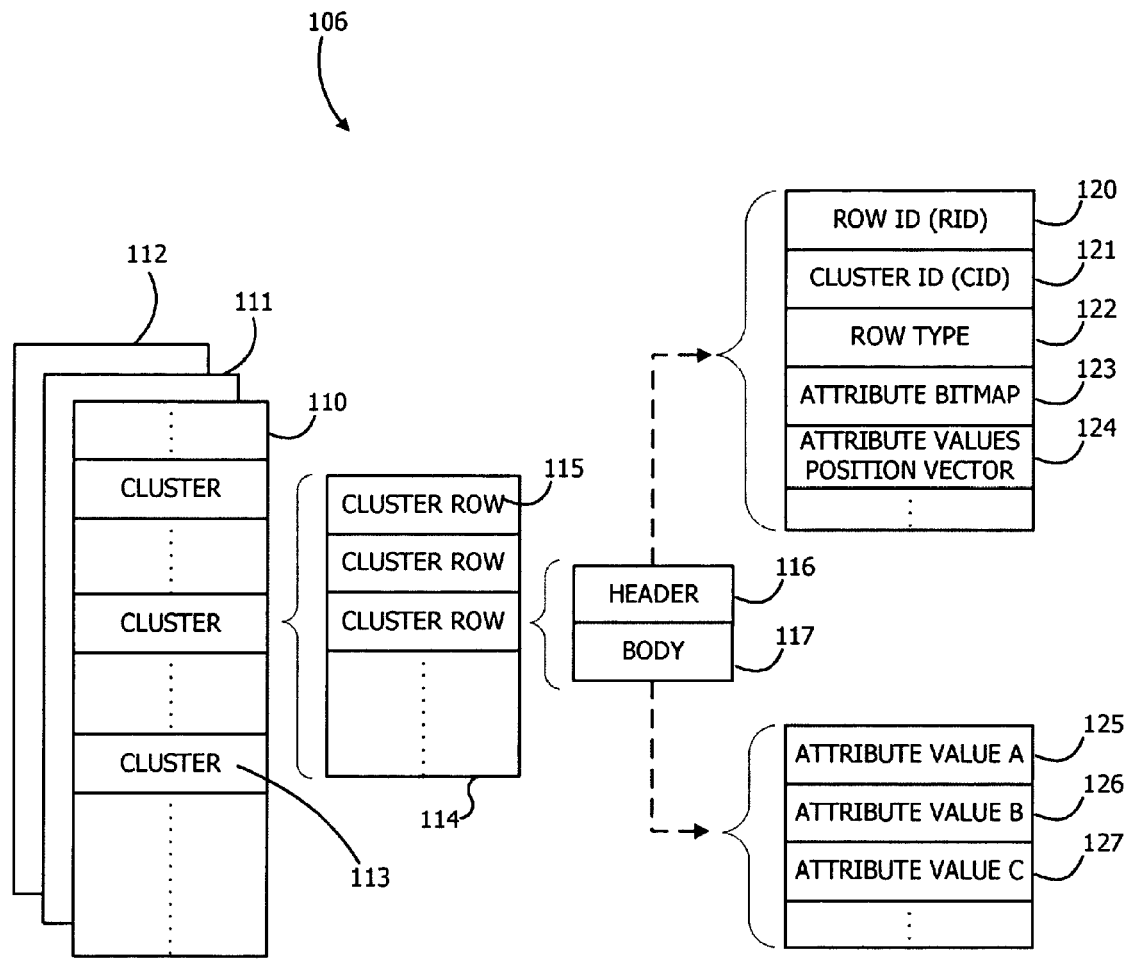
FIG. 7 is a logical depiction of a storage schema for a database in a first dimension in accordance with this invention.

The first dimension data store unit 106 stores data in a "horizontal" schema such that data is easily accessed. As shown in FIG. 7, data in the first or "horizontal" storage container is characterized by granularity ranked from "container" as the coarsest through "cluster" and "cluster row" to "attribute" as the finest. Each of these terms and phrases has a correspondence to some portion of the logical database shown in FIGS. 1 and 2. A "cluster row" corresponds to one row in a logical table and contains all the data in that row. A "cluster" contains related cluster rows. A "container" contains all the clusters for a given table group.

Figure 1:
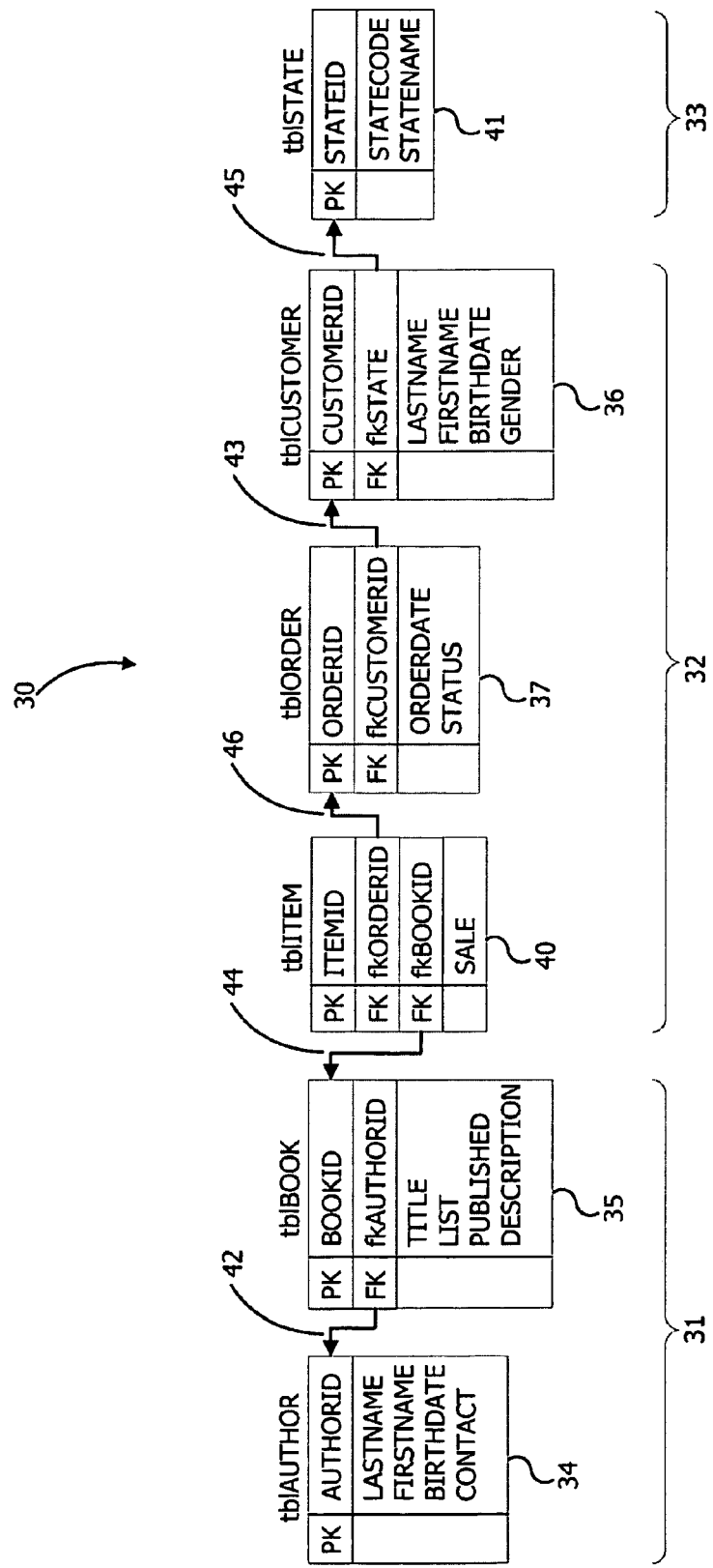
FIG. 1 depicts a typical relationship diagram of the prior art for a sample database including author, book, customer, order, item and state tables.
Figure 2:
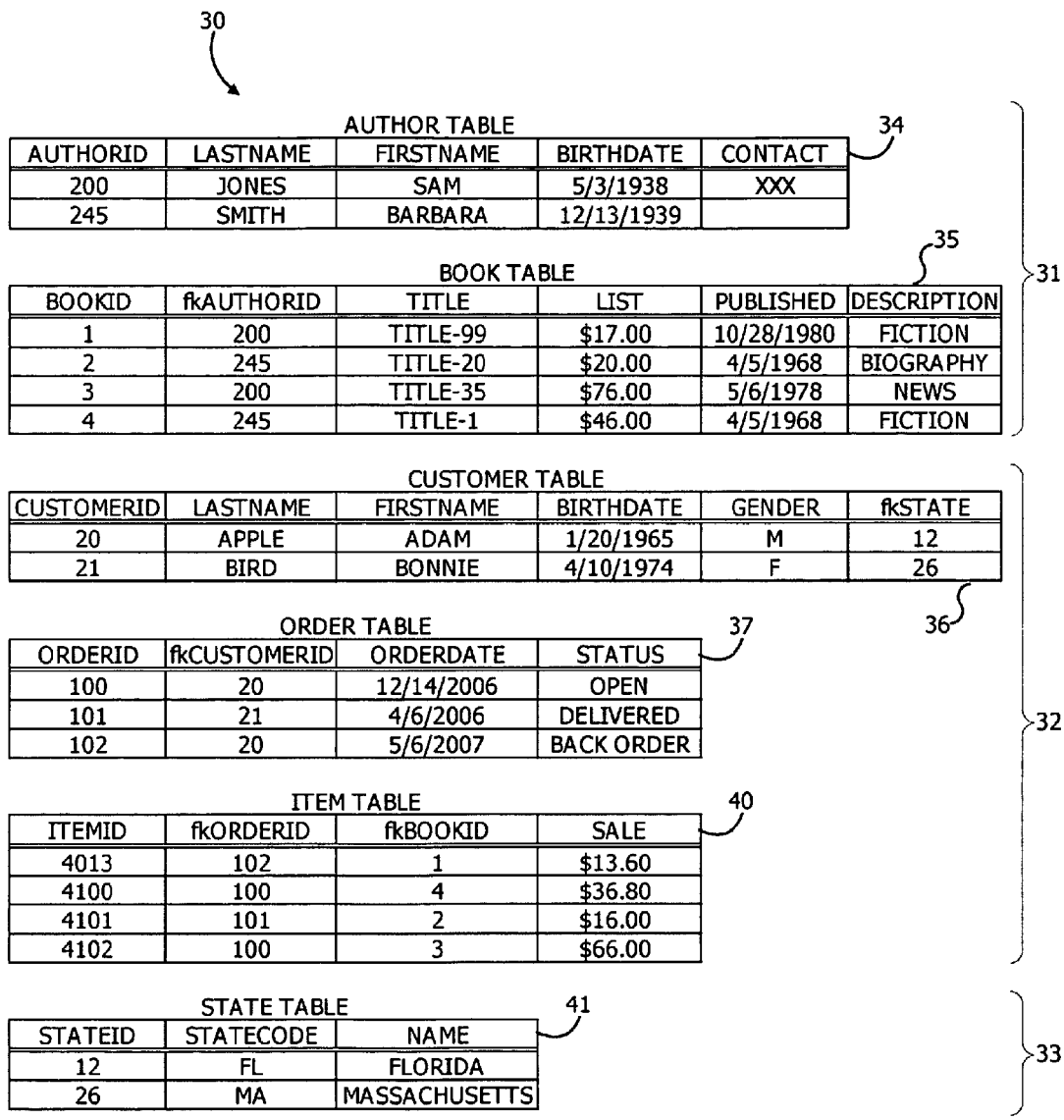
FIG. 2 presents prior art data sheet views for each of the tables of FIG. 1 with some representative data.

As applied to the logical representation in FIG. 1, FIG. 7 depicts a first container 110 for an "author cluster" corresponding to the author table group 31 in FIG. 2. A second container 111 stores a "customer cluster" comprising data from table group 32 including the Customer table 36, the Order table 37 and the Item table 40. A third container 112 stores a "State cluster" comprising data from the table group 33 including the State table 41.

In the container 110, a cluster 113 contains a set 114 of one or more related cluster rows 115. A single cluster row contains all the attributes and values corresponding to one row in a corresponding table. In each cluster, the first cluster row is taken from a "root table" which, for purposes of understanding of this invention, is a table in which the data is independent of data in other tables. In the implementation of the logical database of FIG. 1, the Author table 34, the Customer table 36 and the State table 41 are "root tables."

Each cluster row is stored in successive, or contiguous, storage locations of sequential memory, such as a direct access physical storage device. Preferably, and for reasons that will become apparent later, each cluster should also be stored contiguously to maximize performance by obtaining several points of a result that are located adjacent to each other in one sequential reading operation. In some situations, it will be beneficial to store all the clusters in a container in contiguous storage locations. However, a cluster row, a cluster or a container need not be stored in that manner provided an attendant degradation in performance is acceptable.

Still referring to FIG. 7, each cluster row, such as the cluster row 115, includes a header 116 and a body 117. Each header includes information that describes the contents of the following body. In this specific implementation, each header includes a cluster Row Identifier (RID) field 120, a Cluster Identifier (CID) field 121, a Row Type field 122, an Attribute Bitmap field 123 and an Attribute Value Position Vectors field 124.

In combination, as by concatenation a cluster Row Identifier (RID) field 120 along with a Row Type field 122, the fields uniquely identify a row in the specified container for a table group. A Cluster Identifier (CID) 121 field uniquely identifies a cluster in a container. Specifically the Row Type field 122 identifies a specific table and the order of the RID values corresponds to the order of the rows in that table. Typically the RID value for any table is the table row number. When an auto-increment single attribute primary key is available in a table, the RID field 120 may store that primary key value for that particular row. For other primary key implementations, the RID field 120 may be implemented by an independent counter as a pseudo column added to the table.

For the database of FIG. 1, it is assumed that each of the tables has an auto-increment primary key that is used as the RID. The CID field 121 typically corresponds to the value in the RID field 120 for the corresponding row in the root table. As a result, the first row in a cluster has identical values in the RID field 120 and the CID field 121. However, any arbitrary value system can provide a unique identifier for both the RID field 120 and the CID field 121.

The Row Type field 122 defines the nature of the source of data for the body 117. That is, if the data for a cluster row is from a table, the Row Type field 122 identifies the specific table to which the object corresponds. Other Row Type values could identify an XML documented node, a picture, a DNA segment, "blobs" or other row types.

The Attribute Bitmap field 123 indicates whether each attribute in the cluster row contains data or a null value.

Data in the Attribute Value Position Vector field 124 points to attribute values in the body 117, such as Attribute Value A 125, Attribute Value B 126 and Attribute Value C 127. If the data in a cluster row is stored sequentially, a vector may be defined by an address or an offset from a reference address.

This structure of the data in the first dimension data store 106 provides a major advantage. Specifically, all the records in a table group are stored in a relationship without redundancy without requiring the system to execute a join operation to obtain data from a specific table group. For example, an author cluster will contain an author cluster row with the author's last name, first name, birthdate and contact information. The RID and CID fields 120 and 121 contain the primary key for the corresponding author. The next cluster row will have the same value in the CID field 121, but a new value in the RID field 120 and will store the fkAuthorID value, title, list price, publication date and description for one book written by that author. The cluster will contain an additional cluster row for each additional book that author has written. Each additional cluster row will contain the same value in the CID field 121, but a unique value in the RID field 120. It is these RID and CID fields 120 and 121 that allow data to be stored according to the implicit relationships shown in FIG. 1 and ready access to all the information about an author and his or her books without having to execute a join operation.

As will become apparent, if a table in FIG. 1 has an "auto-increment" type of primary key, the primary key value also identifies the table row. Consequently, the RID value 129 corresponds directly to the primary key value; that is, the RID attribute 120 is equivalent to the primary key attribute. Therefore, it is not necessary to store primary key values in the body 117 of any cluster row 115. If the primary key and RID values are not the same, e.g., the primary key is an email address and not used as the RID, the primary key attribute is stored in the body 117.

Second Dimension Data Store Unit 107

Figure 8:
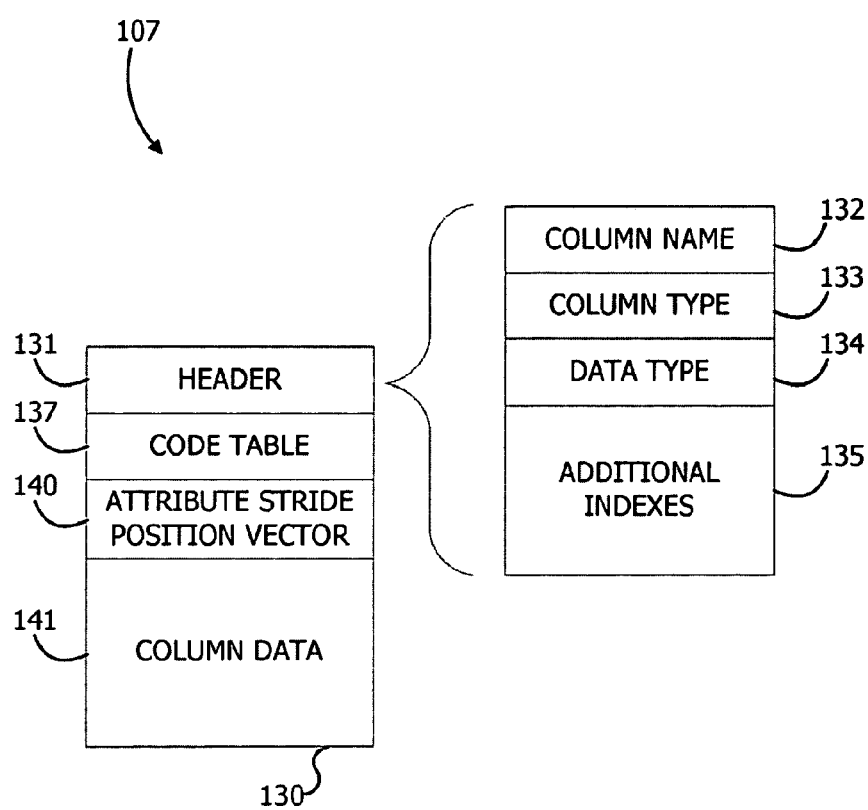
FIG. 8 is a logical depiction of a storage schema for a database in a second dimension in accordance with this invention.

Now referring to FIG. 8, the second dimension data store unit 107 also comprises containers. In specific implementation these are "column containers." There is one column container for each table-attribute combination stored according to the storage schema of FIG. 8.

Each column container 130 includes a header 131 with a column name field 132, a column type field 133, a data type field 134 and an additional indexes field 135. The column name field 132 uniquely identifies the column container. One identification method comprises a concatenation of a table name and an attribute. For example, AUTHOR:LASTNAME in the column name field 132 distinguishes it from another column for another attribute, even with the same field name, i.e., a CUSTOMER:LASTNAME column container. The data dictionary 102 in FIG. 6 contains this information.

The column type field 133 indicates the structure of the data for that field. Examples of various constructs include fixed-length or variable-length fields and fixed-length code tables. The data dictionary 102 in FIG. 6 contains this information. Still referring to FIG. 8, the data type field 134 also uses data dictionary information to identify the nature of the data which, in turn, identifies the nature of storage for that field. Normally all the values in a column will be of the same data type allowing for very efficient compression. Stings and long integers are examples of data types. The additional indexes field 135 identifies what indexes exist for that attribute, and an attribute may have no indexes, one index or several indices. For example a date data field may have one index optimized for retrieving ranges of dates and another index optimized for finding a specific date.

For a column with an attribute of "gender" or the like where the range of values is relatively small, a code table 137 indicates each code and its meaning. In a gender code table, for example, a "0" may indicate a male and a "1", a female. An attribute stride position vector 140 is normally used with variable-length data types. Each location in the vector is a direct or indirect pointer to the actual data. A column data field 141 contains the data according to the format defined in the header 131.

A major feature of a column container is its capability of being optimized for sequential access by contiguously storing the set of values of each attribute as a column. That is, string data can be stored in one configuration while code data can be stored in another configuration for improving access. Another advantage of the column container is the ability to store the data in a column container in a highly compressed format. Specifically the column type field 133 defines different structures of the data, each designed to accommodate certain data types as well as certain characteristics of the data in the column. For example a sparse column of fixed length data could utilize a column type field 133 defining a construct that includes a BITMAP to identify which rows contain non-NULL values, as well as a column data field 141 that stores only non-NULL values for these rows.

Collectively the column containers in the second dimension data store unit 107 provide a copy of the database that is independent of the copy in the first dimension data store unit 106. That is, rather then retrieving specific rows based on a certain criteria like an index in the prior art, a column is designed to efficiently retrieve a vertical section of an original table that can be processed as part of a query's resultset.

As previously stated, the RID field for a table identifies a row in that table. The column structure requires that the RID always identify a corresponding column position. That is, if the RID for the root table in the Customer-Order-Item group is "20", the 20th row in each column container associated with the Customer table must correspond to the data in the 20th row of the Customer table. Consequently, if the RID attribute 120 is equivalent to the primary key attribute, it is not necessary to create a container for the primary key. If the primary key and RID values are not the same, the primary key attribute is stored in a corresponding column container. For the database of FIG. 1, the second dimension data store unit 107 includes twenty-two columns, not twenty-eight columns because each table in FIG. 2 has an auto-increment primary key that is used as the RID.

Forming a Database

As previously stated, SQL is a well-known and popular standard that provides database architects with a familiar interface to the front end of a database management system. Any implementation of a back end that stores the data and processes queries must be transparent to the database architect. This invention provides such transparency whereby a database architect can interact with the database management system with conventional SQL queries while the front and back ends define and populate the database according to the schemata shown in FIGS. 7 and 8 thereby to achieve better throughput and response, as will be demonstrated.

Like the prior art, a database architect interacts with a database management system incorporating this invention by defining tables and attributes. Foreign and primary keys define relationships among tables as shown in the logical diagram of FIG. 1. As a logical database, such as the database in FIG. 1, is defined or updated, processes known in the art construct or update a data dictionary and update the data in the tables. In accordance with one implementation of this invention, a data dictionary, such as the data dictionary 102 in FIG. 9, receives the same basic metadata as was shown in FIG. 4. The tables and attributes are identified, such as shown in the dictionary metadata portion 34D associated with the author table 34.

This invention also requires additional information that identifies "table groups", and, for each table group, its "root table" and relationships among the tables in that table group. This information facilitates the physical storage of a logical database such as shown in FIG. 1 according to the respective schemata of the first and second dimension data store units 106 and 107 of FIG. 6. FIGS. 9, 10A, 10B and 11A through 11E depict a process that transforms the logical tables of FIG. 1 into these diverse storage schemata.

Figure 9:
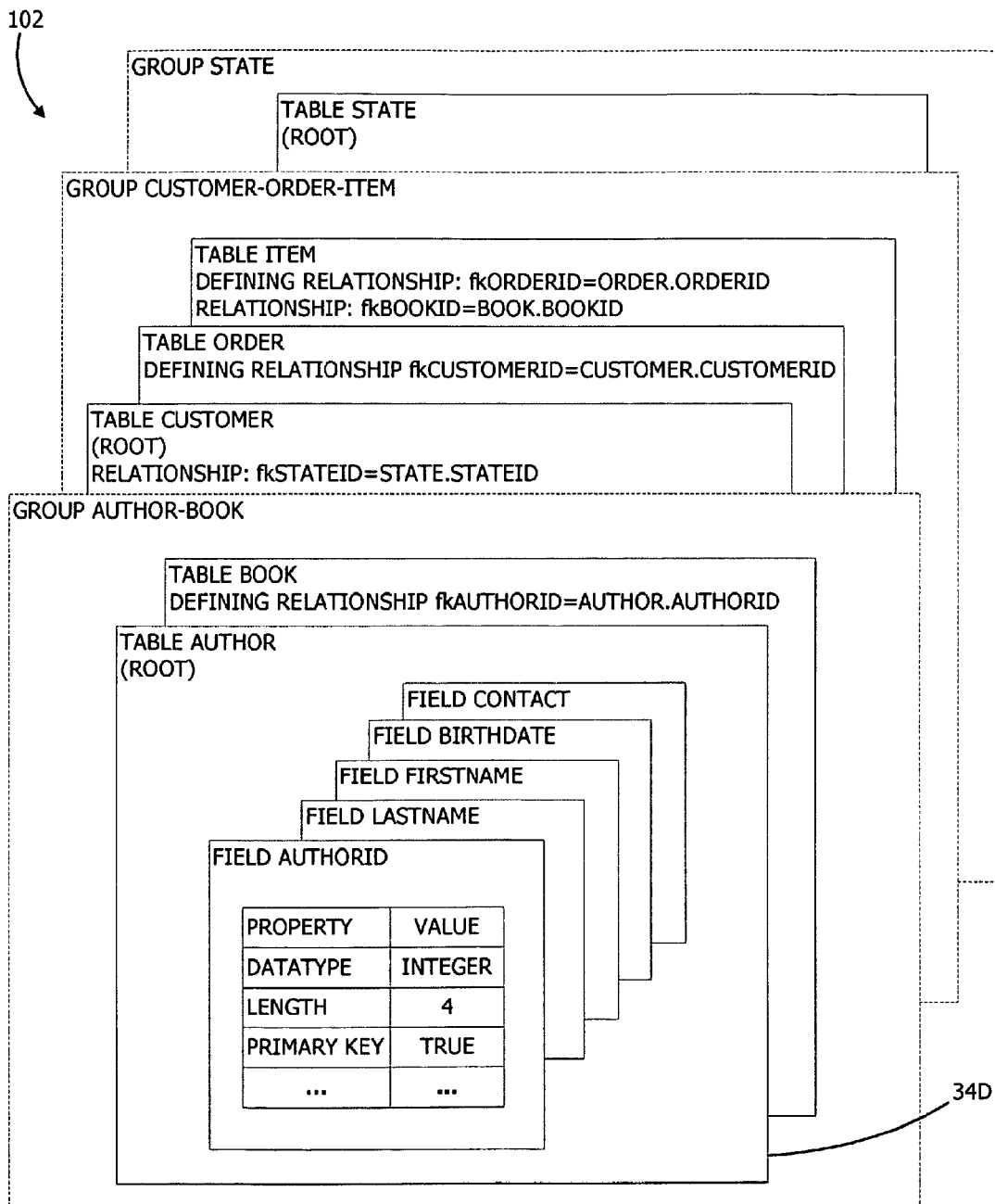
FIG. 9 is a functional block diagram that discloses a data dictionary that is generated during the use of this invention.
Figure 10A:
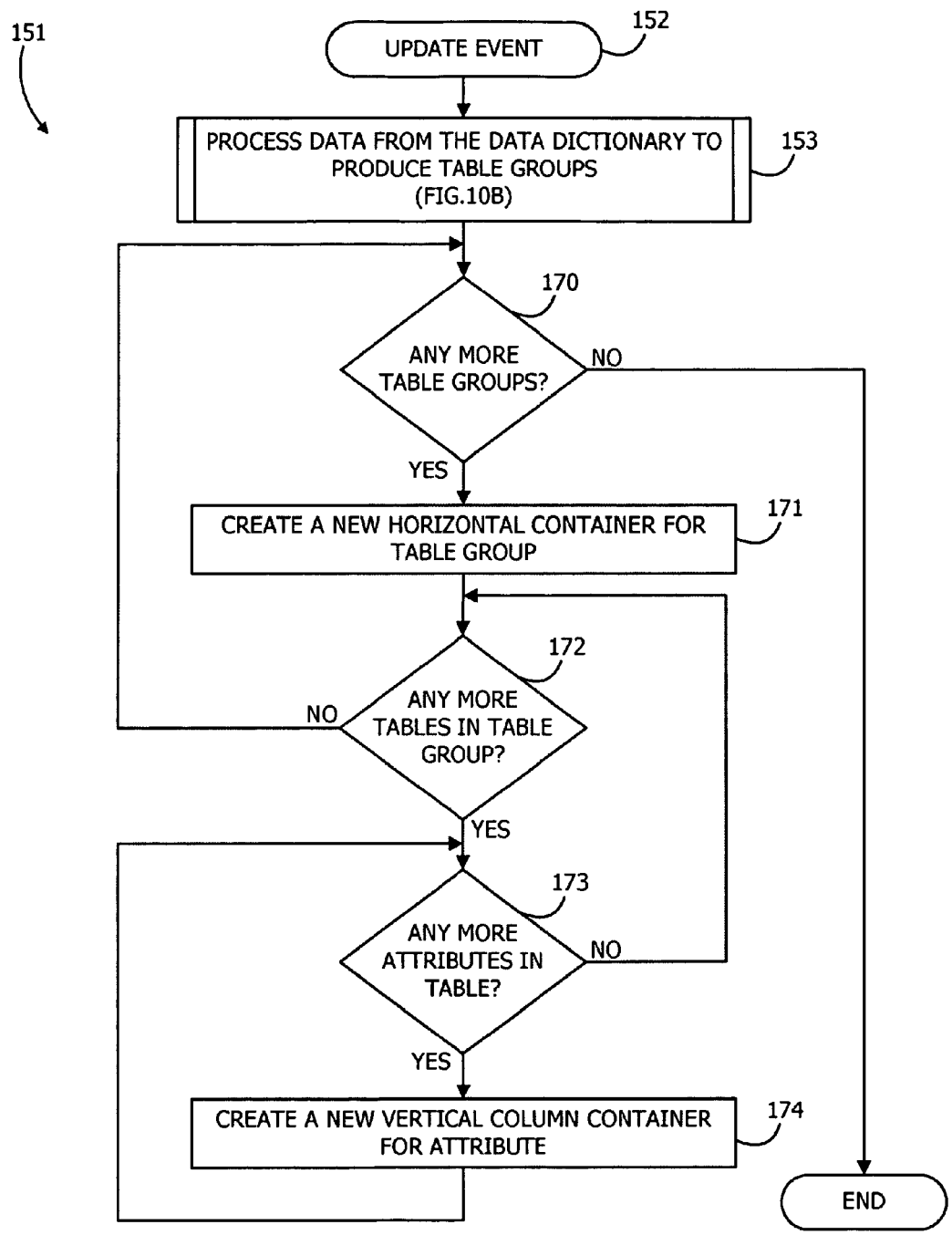
FIGS. 10A and 10B are flow diagrams of a process for producing storage schemata of FIGS. 7 and 8.
Figure 10B:
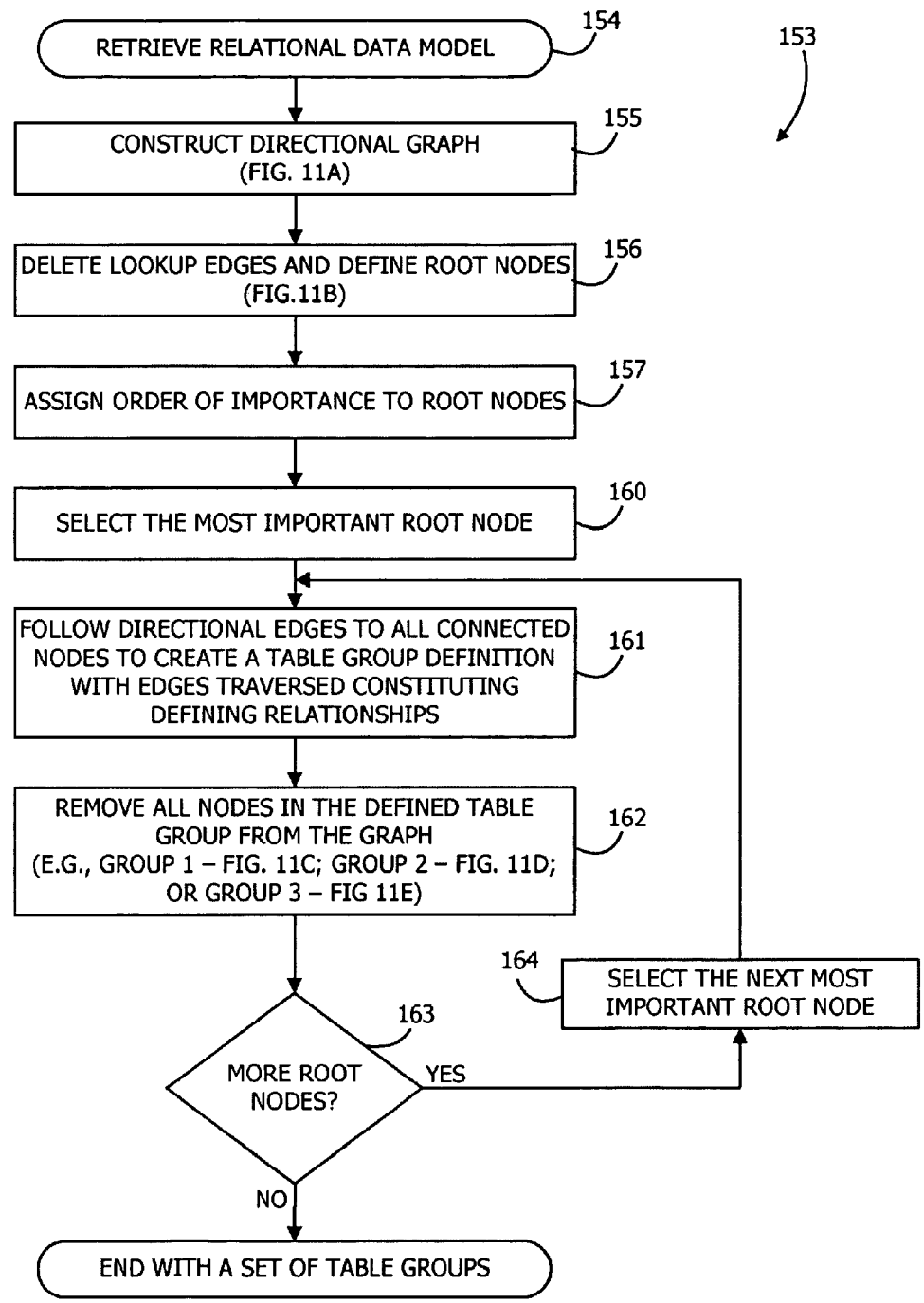

Looking first at FIG. 10A, a process 151 begins at step 152 any time a table, relationship or attribute in the relational model is created, deleted or updated; i.e., an "update event." A subroutine 153 defines table groups in response to information in the data dictionary 102 according to the steps shown in FIG. 10B. Referring now to FIG. 10B that depicts the subroutine 153 in greater detail, after step 154 retrieves the relational data model from the dictionary 102 in FIG. 9, step 155 constructs a directional graph such as shown in FIG. 11A using known methods and the information in the data dictionary of FIG. 9 including the relationships associated with primary and foreign keys.

In this graph the "tables" are equated to "nodes"; and "links," to "directional edges". Nodes in FIGS. 11A through 11E are identified by the reference numerals for their corresponding tables in FIG. 1 with an "N" suffix; and directional edges, by the reference numerals for the corresponding links in FIG. 1 with an "E" suffix. For example, the author table 34 in FIG. 1 becomes an author node 34N while the link 42 becomes a directional edge 42E. After identifying the nodes, directional edges are defined as extending from a primary key to a foreign key. For example, in FIG. 11A the directional edge 42E extends from the author node 34N with its AUTHORID attribute to the book node 35N as the book table 35 contains the fkAUTHORID foreign key.

Figure 11B:
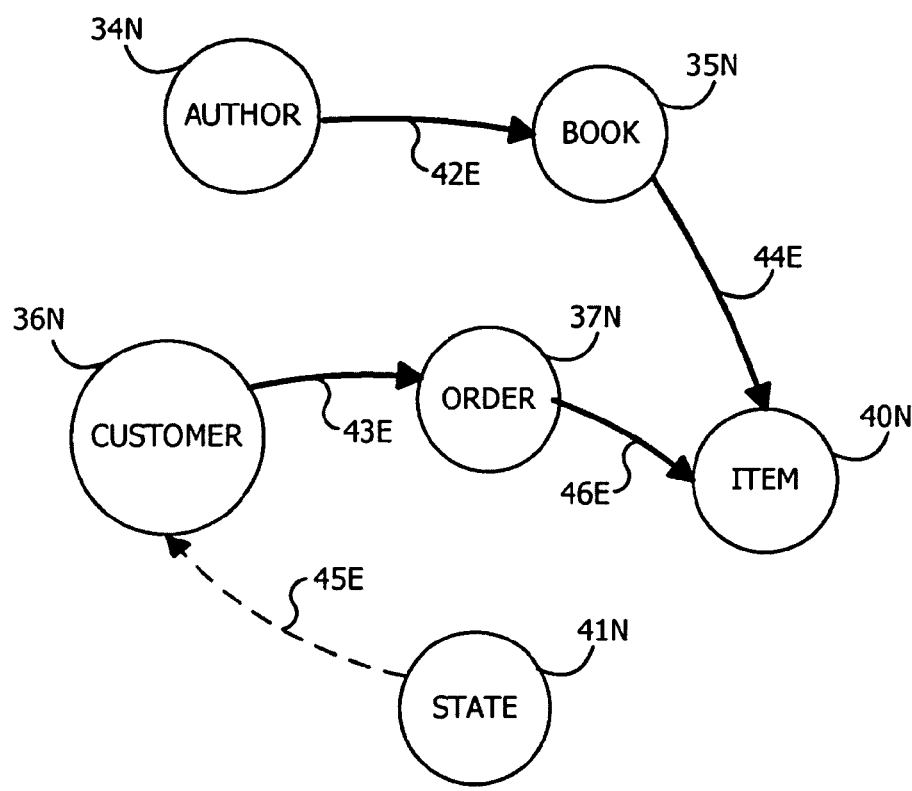

Next step 156 deletes any lookup edges, such as the directional edge 45E, now shown as a dashed line in FIG. 11B. A lookup edge is characterized by a high average cardinality between a lookup table, such as the state table 41 and a non-lookup table, such as the customer table 36. A lookup table is a reference table containing key attribute values that can be linked to other data and do not change frequently.

Thereafter, step 156 defines "root nodes". "Root nodes" are defined as nodes which, after any leading lookup edges have been deleted, have no edges directed at them. In this example, step 156 defines three root nodes, namely: the author node 34N, the customer node 36N and the state node 41N.

Step 157 orders the root nodes by their "importance". Typically "importance" depends upon an expected or measured update access frequency for each table group. In the structure shown in the graph of FIG. 11B it is assumed, for purposes of this explanation, that the customer node 36N will have the most activity; the author node 34N, the next level of activity; and the state node 41N, the least activity. Step 160 selects the most important root node and is an entry into a loop comprising steps 161 through 164 that processes each root node and other associated nodes and directional edges.

Step 161 follows the directional edges to all the connected nodes to create a table group definition and "defining relationships". A "defining relationship" corresponds to a directional edge followed during the formation of each group. As will become evident later, each defining relationship also corresponds to a join that is eliminated from further processing by virtue of the construction of the table group when processed in accordance with FIG. 10A.

During a first iteration, step 161 begins at the customer node 36N and follows the directional edge 43E to the order node 37N and the directional edge 46E to the item node 40N. Step 161 then terminates because the only directional edge, i.e., the directional edge 43E, associated with the item node 40N points toward the item node 40N. The identified nodes define a grouping, or "table group", for their corresponding tables. In this case, the customer node 36N, the order node 37N and the item node 40N define a customer table group 165 including the corresponding customer, order and item tables 36, 37 and 40, respectively. The directional edges 43E and 46E establish the two defining relationships, namely:

(1) fkCUSTOMERID=CUSTOMER:CUSTOMERID stored in the properties of the Order table 37D in FIG. 9, and
(2) fkORDERID=OREDER.ORDERID stored in the Item table 40D.

Figure 11C:
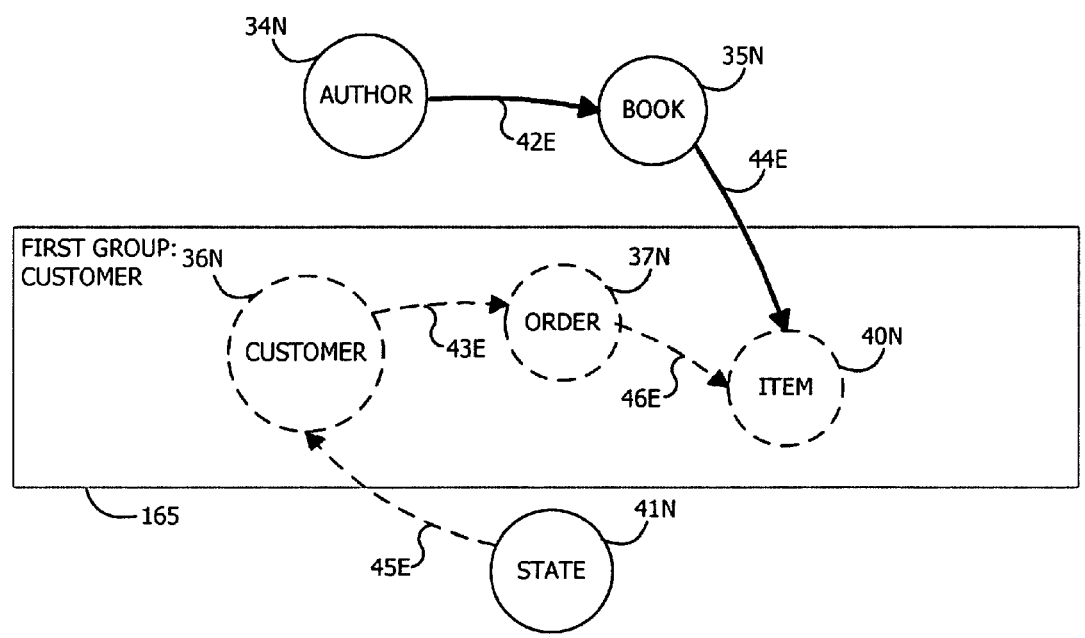

The nodes and directional edges associated with this table group are then removed from the graph as represented by the dashed lines in FIG. 11C. Thus after step 162 is completed during the first iteration, only the author, book and state table nodes 34N, 35N and 41N remain in the graph.

Figure 11D:
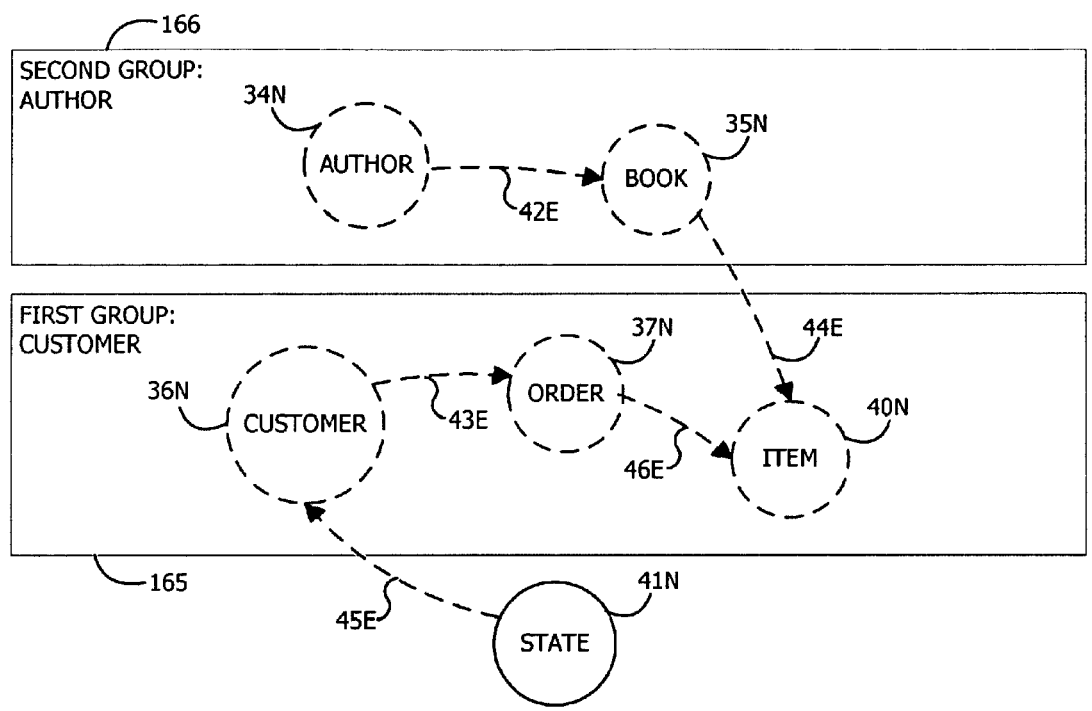

As additional root nodes exist, step 163 transfers control to step 164 to select the next root node in order of importance in step 164, i.e., the author root node 34N. During the second iteration step 161 starts at the author root node 34N and follows the directional edge 42E to the book node 35N in this example. The directional edge 43E no longer points to any other node, the item table 40N having been removed from the graph during the formation of the first, or customer, group 165. Thus when this iteration completes, the directional graph appears as shown in FIG. 11D. The author node 34N and book node 35N now define a second or author group 166 as shown in 11D that contains the author table 34 and the book table 35 with a fkAUTHORID=AUTHOR.AUTHORID defining relationship. Only the state root node 41N remains.

Figure 11E:
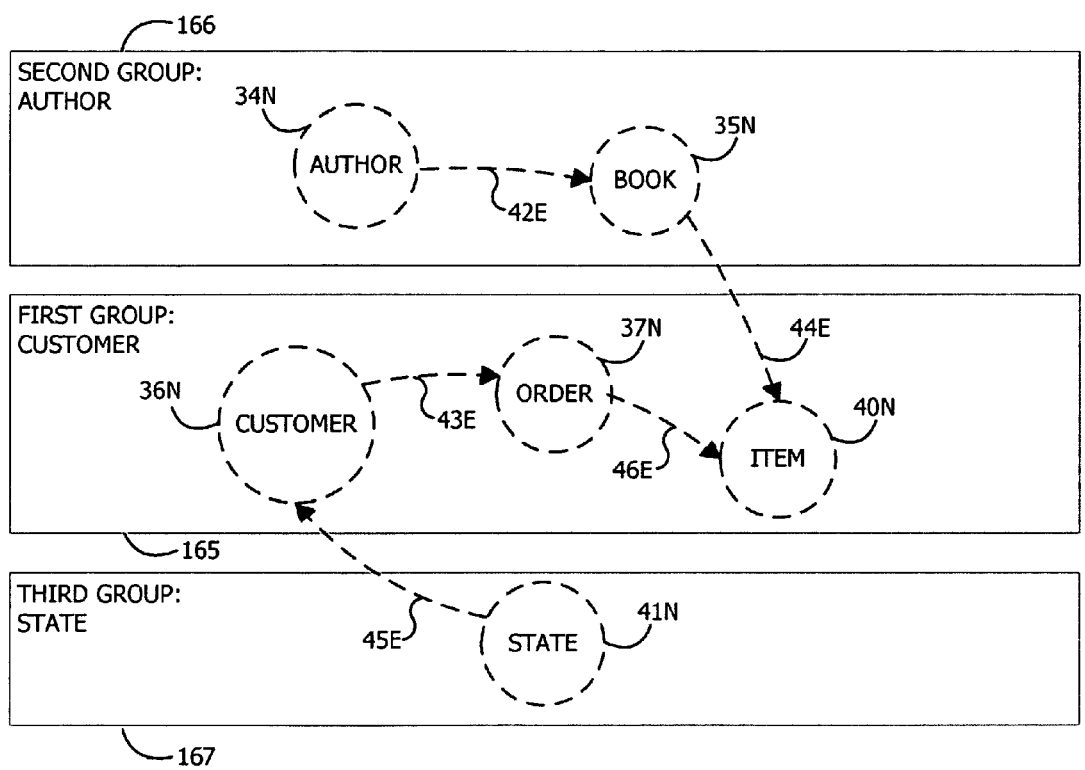

During a third iteration step 164 selects the state node 41N. As the state node 41N stands alone, step 161 creates a third table or state group 167 that only includes the state table 41 as defined by the state node 41N as shown in FIG. 11E. As there are no remaining directional edges, there are no defining relationships. Step 163 in FIG. 10B then diverts to step 165 that passes the information shown in FIG. 11E, specifically the definition of the customer group, author group and state group, to the remainder of the procedure in FIG. 10A.

If the order of importance determination in step 157 of FIG. 10B were changed, the table group definitions would change. For example, if step 157 were to determine that the author table was the most important root node, the first iteration of the loop in FIG. 10B would produce a an author group with the author node 34N, the directional edge 42E, the book node 35N, the directional edge 44E and the item node 40N. Corresponding defining relationships would be generated. A next iteration would define the customer table group with the customer node 36N, the directional edge 43E and the order node 27N and a single defining relationship. The determination of the order of the root nodes is not critical. If the order of importance proves not to be optimal, the order could be manually or be automatically adjusted in response to accumulated statistical information.

Next, control passes back to FIG. 10A whereupon steps 170 through 174, that form a series of nested loops, systematically process the information obtained by subroutine 153. During multiple iterations the nested loops generate containers for each of the first and second dimension data store units 106 and 107 in FIG. 6 implementing the data structures of FIGS. 7 and 8. For the specific example of FIG. 1, a container is formed in the unit 106 for each table group and, in the unit 107, a container for each table and attribute in that table. Specifically step 170 determines whether any more table groups need to be processed. Initially all the table groups have to be processed, so one is selected. The order is not important.

Step 171 creates a new horizontal container data structure for that group using corresponding metadata including the information stored with the attributes, like "length," and the defined relationships. That is, step 171 produces data structures, like the data structures of the author container 110, the customer container 111 and the state container 112 shown in FIG. 7.

Next the system processes tables and their attributes. Step 172 determines whether any more tables in the group need processing. If not, control passes back to step 170. If there are more tables, step 173 determines whether any more attributes in that table need to be processed. If not, control transfers back to step 172. If there are, then step 174 creates a new column container data structure for each attribute in that table, each container having a data structure such as shown in FIG. 8. As previously indicated, for the logical database shown in FIG. 1, the system will create four column containers for the author table 34, five, for each of the book table and customer tables 35 and 36, three, for the order table 37 and item table 40 and two, for the state table 41.

The foregoing description of FIGS. 10A and 10B is particularly directed to the creation of a database. As will be apparent to those skilled in the art the process 151 can be adapted, in whole or in part, to handle any changes in relationships or the addition, deletion or modification of tables and the addition, deletion or modification of attributes.

It will now be helpful to describe the specific implementation of the storage schema in the containers for the first dimension data store 106 in FIG. 6 for the database of FIGS. 1 and 2 in accordance with this invention. FIG. 12 presents the overall logical organization of the data store unit 106 with its stored containers 110, 111 and 112 produced by step 171 in FIG. 10A after successive iterations as previously described. The author container 110 includes one cluster for each author. In the specific implementation for the data in FIG. 2, a cluster 180 stores information about the author Sam Jones; the cluster 181, Barbara Smith.

Each cluster has one or more cluster rows. In this example, each cluster includes an author cluster row and two book cluster rows. In the specific application and in accordance with the graph of FIG. 11E, the author cluster 180 includes an author cluster row 182, a book cluster row 183 and a second book cluster row 184, there being one book cluster row for each book in the database by that particular author. The cluster 181 for Barbara Smith also includes an author cluster row 185 and two book cluster rows 186 and 187.

Although FIGS. 12A-1 and 12A-2 depict the details of both clusters, the following description is centered on the cluster 180 in FIG. 12A-1. The author cluster row 182 includes an RID field, a CID field, a cluster row type, an attribute bitmap, a pointer to the attributes listed as being present in the cluster row, all as shown in FIG. 7. The text in the upper portion of each cluster row is for purposes of explanation only. Only the data in the lower portion is stored. In this cluster row 182, the RID and CID values are the same, designating a root cluster row corresponding to one row in the root author table 34 in FIG. 2. For this author, the cluster row is in the 200th row of the corresponding column in the column container. In this example, all the attributes have values, so all the attribute bitmaps have "1" values. The pointer (PTR) field points directly or indirectly to the values for each of the four attributes that the attribute bitmap identifies. As previously described, the primary key attribute is not present in the body of the cluster row because it is used as the RID value and, along with cluster row type field, it defines a unique table and row.

Each of the cluster rows 182 and 183 has a different RID value that corresponds to a unique value for the book in the book table 35 or author table group 165. The CID field includes the same value as in the CID field in the author cluster row 182. This establishes the book as being associated with the author. The PTR field points to the values for each of the five attributes that the attribute bitmap identifies.

Each of the cluster rows 185, 186 and 187 for the cluster 181 in FIG. 12A-2 has a similar structure to the corresponding cluster rows 182, 183 and 184 in FIG. 12A-1. There is one difference that highlights another feature of this invention. According to the data in FIG. 2, Adam Apple has provided contact information; Barbara Smith has not. In the prior art, Barbara Smith's contact attribute would be stored in a "null field". As shown, the "Contact" entry in the attribute bitmap 190 in the cluster 182 contains a "1" and the Contact attribute 191 contains data. In the cluster row 185, the Contact entry 192 in the attribute bitmap contains a "0", and no memory space is allocated for the Contact attribute as represented by the dashed lines at 193. This feature eliminates the need for storing and processing a null value for the Contact attribute 193. As apparent this feature contributes to a reduction in storage space and simplifies the data architect's formation of SQL queries.

FIGS. 12B-1, 12B-2 and 12B-3 present the storage implementation for the customer table group 165 in the container 111 that includes data from the customer, order and item tables 36, 37 and 40 in FIGS. 1 and 2. As shown in FIG. 12 the customer container 111 includes one cluster for each customer. In the specific implementation for the data in FIG. 2, a cluster 194 stores information about Adam Apple; the cluster 195, about Bonnie Bird.

Looking at FIGS. 12B-1 and 12B-2 as a representative example, the cluster 194 includes a customer cluster row 200 and two order cluster rows 201 and 202 corresponding to two orders by Adam Apple. Each of the order clusters is followed by item cluster rows. Specifically order cluster row 201 is followed by two item cluster rows 203 and 204 while order cluster row 202 is followed by a single item cluster row 205. The storage for the cluster 195 for Bonnie Bird follows this organization. As Bonnie Bird has placed one order for one book, the cluster 195 contains a customer cluster row 206, an order cluster 207 and a item cluster 208.

As the state table group in the container 167 has only one table, the storage appears as shown in FIG. 12C wherein the container 167 stores one state cluster for each state, two state clusters 210 and 211 being shown. As FIG. 11E includes only one node in the state table group, each cluster is formed by a single cluster row.

As previously indicated, the second dimension data store 107 in FIG. 6 stores one container for each table-attribute combination derived from the logical database in FIG. 1. If the RID field contains the primary key value, no column need be stored for the primary key attribute.

Each container stores a header and data. In the following discussion "header" and "data" are used to define a specific field, such as the header field, or the information contained in that field as the context shall admit. FIG. 13 depicts three instantiations of column containers for the database of FIGS. 1 and 2 having the general structure as FIG. 8. Still referring to FIG. 13, each of the containers includes a "header" and "data" section. That is, a container 220 includes a "header" 223 and "data" 224; a container 221, a header 225 with an attribute stride position vector 226, such as the vector 140 shown in FIG. 8, and data 227; the container 222, a header 230 with a code table 231 and data 232.

The header in each column container includes a unique identification and information about the characteristics of the data. In these instantiations the unique identification includes a concatenation of the table name and the name of an attribute in that table. For example, the identification for column container 220 is BOOK_LIST. Thus column 220 contains the list price for all the books in the Book table 35. Each of the containers 221 and 222 represent the LastName and Gender attributes in the Customer table 36 and are identified uniquely by CUST_LASTNAME and CUST_GENDER, respectively.

The portion of each header defining data characteristics uses information from the data dictionary in FIG. 9 based upon initial selections that the data architect makes. The container 220 defines fixed-length long-integer data; container 221, variable-length string data; and container 222, fixed-length code table with string data.

In this implementation, the primary key for a table is assumed to be a auto-increment counter so the counter value identifies each row in that table in succession. For example, the value "17.00" in the data 224 of the container 220 refers to row number "1" in that table. In this embodiment there is essentially a counter associated with each table that identifies a particular row in that table.

It is a necessity that, any implementation requires that the order of data in any column container be in the same sequence as the other column containers of the same table. In each row in a column container for an attribute for the same table uses the primary key as a pointer for the data in that row. The use of this form of identification is independent of the data in a container. For example, the container 221 could include multiple rows with a common last name like "JONES". Each instance of the last name will have a unique identifier; i.e., the primary key value for the Customer table 36.

Query Processing

The interaction among the query processor 103, the first and second data store units 106 and 107 in FIG. 6 and the data dictionary 102 in FIG. 9 in response to a query is now described with reference to an iterative routine 240 in FIG. 14 for constructing a query plan. The query processor 103 first identifies all the table groups involved in the query at step 241. Then an iterative process comprising steps and subroutines 242 through 245 selects an identified table group at 242. The query parser 101 initially uses information from the query and the database to identify which tables in that table group are relevant to the analysis. Next an optimizing stage, in subroutine 244 determines how much of the database will be accessed for the selected table group and processed to obtain intermediate result set with all the data that satisfies the query criteria for that table group. When step 245 determines that all the relevant table groups have been analyzed, a join/process stage 246 combines the individual intermediate result sets into a formal result set that contains the information the query requested.

Figure 14A:
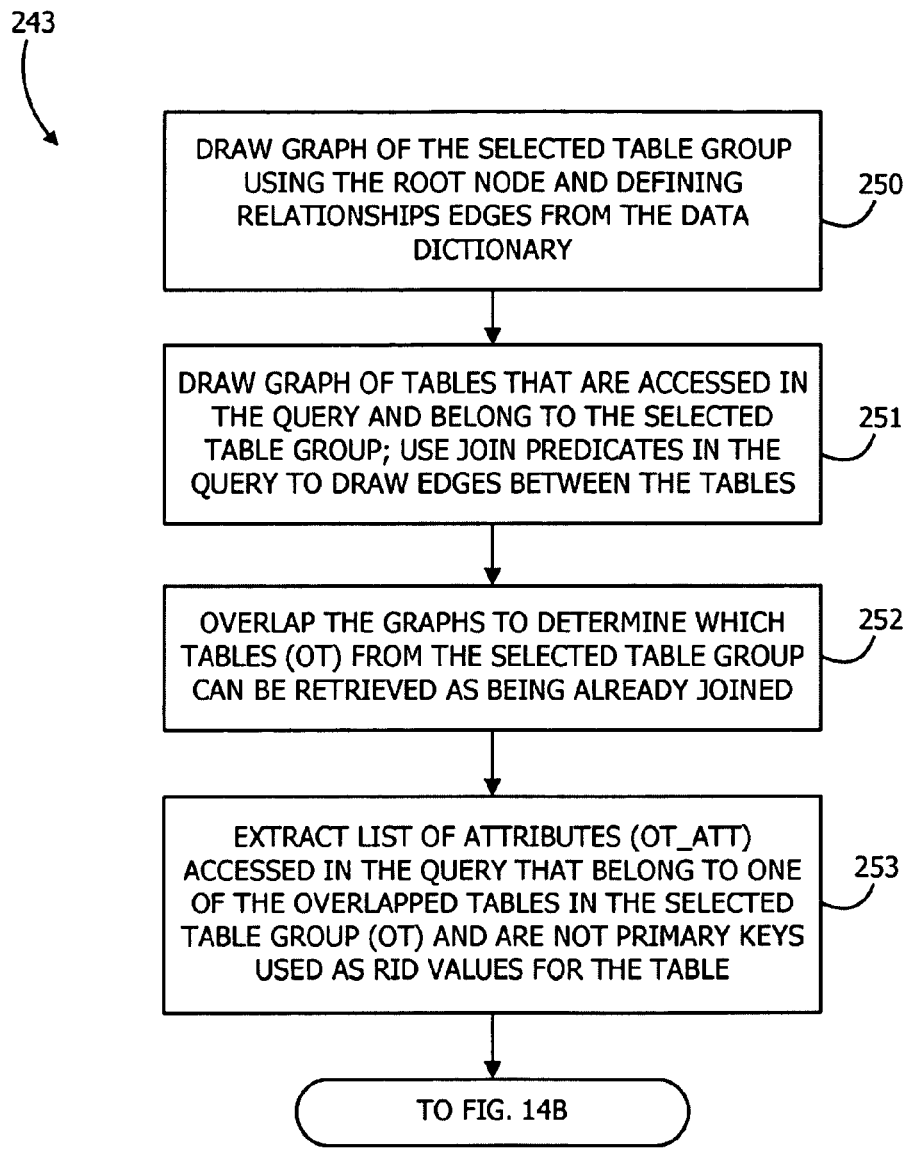
Figure 14B:
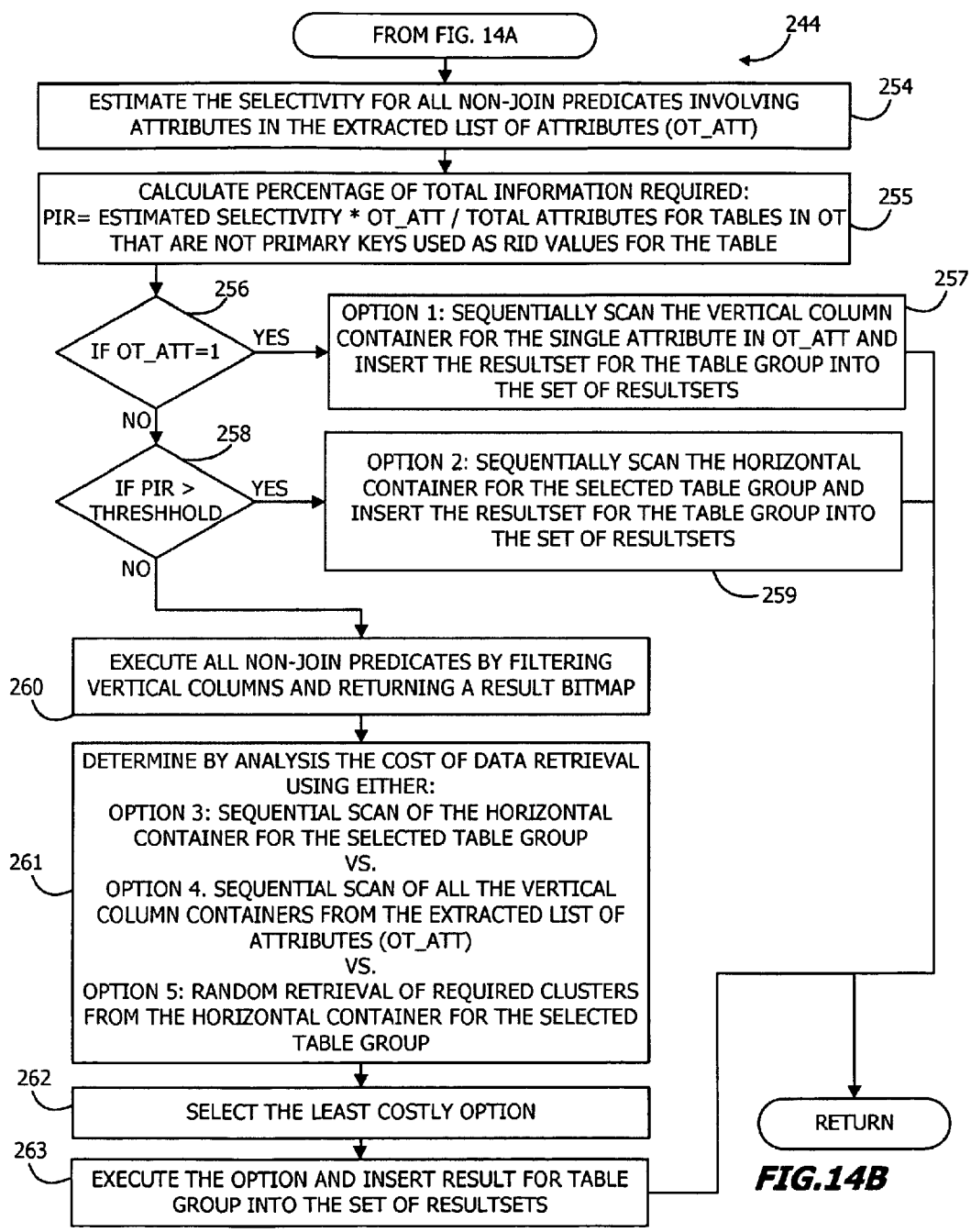

FIG. 14B discloses the steps by which the parsing stage 101 determines the relevant tables.

Specifically, step 250 draws a first graph of the selected table group using the root node and defining relationship edges from the data dictionary thus to provide a graph, like the graph of the Customer table group 165 in FIG. 11C, containing the Customer node 36N, the Order node 37N and the Item node 40N and the corresponding directional edges 43E and 46E.

Step 251 draws a corresponding second graph based upon the information in the query, such as shown in Tables 1 and 2 below. In the case of the Customer table group, step 251 uses the Customer table T1, the Order table T2 and the Item table T3 and the join predicates 54 and 55 in the query.

In more detail, assuming that the query in FIG. 3A includes tables "Ti" and attributes "Aj" where "i" and "j" denote a number such that Ti and Aj designate a table and an attribute in each table, step 251 could identify the tables and attributes that form the query as follows:

TABLE 1

QUERY IDENTIFICATIONS

| | | ATTRIBUTES | |
|---|---|---|---|
| MNE-MONIC | DEFINITION | MNE-MONIC | DEFINITION |
| T1 | CUSTOMER TABLE | A1 | tblCustomer.FirstName |
| T2 | ORDER TABLE | A2 | tblCustomer.LastName |

TABLE 1-continued

QUERY IDENTIFICATIONS

| | | ATTRIBUTES | |
|---|---|---|---|
| MNE-MONIC | DEFINITION | MNE-MONIC | DEFINITION |
| T3 | ITEM TABLE | A3 | tblBook.Title |
| T4 | BOOK TABLE | A4 | tblItem.Sale |
| | | A5 | tblCustomer.CustomerID |
| | | A6 | tblOrder.fkCustomerID |
| | | A7 | tblOrder.OrderID |
| | | A8 | tblItem.fkOrderID |
| | | A9 | tblBook.BookID |
| | | A10 | tblItem.fkBookID |

Attributes A1 through A4 are taken from the "Select" statement 51 in FIG. 3A; tables T1 through T4 from the "From" statement 52; and attributes A5 through A10 from the lines 54 through 57 of the "Where" statement 53 that define the predicates. Line 57 in the "Where" statement 53 is a "selectivity" predicate. The join predicates from lines 54 through 56 are represented as:

TABLE 2

JOIN PREDICATE IDENTIFICATIONS

| Join predicate 54 | T1.A5 = T2.A6 |
|---|---|
| Join predicate 55 | T2.A7 = T3.A8 |
| Join predicate 56 | T4.A9 = T3.A10 |

Step 252 then analyzes the graphs to determine which tables and relationships are common to both graphs. Put another way, step 252 identifies those tables within the table group that are involved in the query and that are joined using the defining relationships in the data dictionary 102. The analysis of the Customer table group 165 in this example identifies all three of the tables in the Customer table group for retrieval. As the data for the set of tables in the table group can be retrieved from the corresponding cluster container with its pre-joined clusters, there is no need for inter-table group join operations to define the relationship for the individual tables in the Customer table group. It is possible that some tables will not overlap or will not be connected to another table in the table group, in which case, connected tables form subgroups that are processed independently.

In FIG. 14B step 253 extracts a list of all the attributes (OT_ATT) to be accessed by the query and that are included in one of the overlapped tables (OT) and that are not primary keys that also serve as an RID for a given cluster in a container. Conceptually, the extracted list of attributes represent the set of columns that should be accessed in order to produce the resultset for this table group using the second dimension data store unit 107. In the case of the Customer table group, the number of listed attributes (OT_ATT) identifies all the accessed attributes in the Customer table 36, the Order table 37 and the Item table 40. Referring to Table 1, the list would include each of the attributes A1-A4, as well as A6, A8 and A10. As each of the attributes A5 and A7 is a primary key used as an RID, they are not included. Attribute A9 is not included because it belongs to another table group.

The selection of a processing method for the table group begins after the actions of step 253 have completed with an estimation of selectivity and the percentage of the data in the table group that will be accessed. Now referring to FIG. 14B, in step 254 the system estimates the selectivity for non-join predicates that involve an attribute in the extracted list of step 253. In one approach the system examines the designated column container or containers for the attribute or attributes in a non-join predicate. Then it estimates a percentage determined by the number of rows expected to be selected to the total number of rows in the column container. When there are multiple non-join predicates the results are combined statistically to obtain an overall selectivity estimate. A simple approach is merely to multiply the estimated selectivity for each of the filtered attributes in one table. Selectivity can vary from "0" for a high selectivity to "1" for low selectivity, a "1" indicating that all the rows associated with the attribute will be involved. The overall selectivity tends to indicate the number of root table rows or clusters that will be accessed. Stated differently, the overall selectivity value indicates the percentage of the total number of clusters needed to be accessed in the current table group.

When the overall selectivity has been determined in step 254, step 255 calculates a percentage of total information (PIR). The PIR value tends to indicate the percentage out of the total amount of data in the container of the table group that needs to be accessed. It is calculated as follows:

$$PIR = (\text{ESTIMATED\_SELECTIVITY}) * \left[ \frac{OT\_ATT}{TOTAL\_ATTRIBUTES\_IN\_OT} \right]$$

In the case of the query of FIG. 3A and referring to Table I above, OT_ATT=7 and OT=22. If there is no selectivity, PIR=0.58. As selectivity increases, the PIR decreases approaching zero as in the case of FIG. 3A where only one customer is selected by the non-join predicate 57.

Step 258 compares the PIR value with a threshold. The threshold is set according to a number of factors and processes that are well-known in the art. Examples of the factors to be considered include table group size, disk latency and bandwidth, memory latency and bandwidth. The estimation of join operation cost is an example of a process. Typically these processes statistically analyze system operations over a period of time and periodically perform the analysis of steps 253 through 255. For example, the threshold could be calculated as the percent of data from the table group that could be read sequentially during one random operation. If the bandwidth allows reading 30% of the clusters in the container for a selected table group in the same time it would take to perform one random read, the threshold for the table group could be set at 70%. This value could then be adjusted manually and/or automatically based upon the available statistics.

The optimizing stage 244 uses the number of attributes in the extracted list and the PIR value as initial criteria for selecting one of several options. In this embodiment there are five options. If there is only a single attribute in the extracted list, step 256 diverts to step 257 to process a first option. As there is only one attribute, only a single vertical container needs to be scanned. Step 257 then produces an intermediate result set for that table group. If there are more than one attributes, step 258 examines the PIR value. If the PIR value is greater than the preset threshold, step 258 transfers control to step 259 representing a second option. Specifically, this decision indicates that a high percentage of the clusters in corresponding container 110 of FIG. 7 needs to be scanned to obtain a resultset and that a scan of all the clusters in the table group container will provide the best result. Step 259 performs that task by sequentially scanning the cluster rows in the container and obtains a resultset based on the information in that table group. The output of step 259 is therefore an intermediate resultset with rows of data for the table group that satisfy that portion of the given query.

As the selectivity increases or the ratio of attributes OT_ATT/OT decreases, the PIR value will fall below the threshold. Step 258 diverts to step 260 that executes any relevant non-join predicates in the query thereby to filter the corresponding vertical columns. It returns an intermediate resultset as a bitmap representing the rows that are to be accessed in each relevant table.

Step 261 analyzes the results of step 260 and statistically analyzes the cost of several alternatives, three such alternatives are shown in FIG. 14B and represent third through fifth options. "Costs" in the context of this invention are estimates of the time required to complete an operation. The estimates for a sequential scan of a cluster or a vertical column in memory is the time to read that data. If the cluster or vertical column is only on a disk, the time depends on the time to reach a first location plus the time to process each of the sequential values for that attribute. For random operations, such as involved with Option 4, will include the time for each access to the attributes.

Specifically, Option 3 calculates a cost of sequentially scanning all the data in the horizontal container 110 for the table group. Option 4 calculates a cost of sequentially scanning the data in each vertical column container corresponding to the extracted list of attributes obtained in step 253, joining these columns. Option 5 calculates cost of a random retrieval of clusters from the horizontal container 110.

Step 262 selects the option with the lowest cost of all the options provided by step 261 including the three options. Other options might also be considered.

In this embodiment step 263 immediately begins to define an intermediate resultset. This is particularly advantageous in a multi-processing system because information from step 262 can immediately begin operation and, if there are multiple table groups, the function of step 263 can be directed to different processing systems for parallel processing. Other alternatives can be used. For example, the data from step 262 corresponds to a step in a query plan. These steps can be buffered. Then the system can process the information for each table group sequentially as disclosed in the query plan.

This ends the analysis of the table group selected at step 242 in FIG. 14. In the specific query of FIG. 3A, step 245 in FIG. 14 returns control to step 242 to select the second table group, for example, the Author table group that includes the Author table 34, the Book table 35 and the link 42. When step 252 in FIG. 14A overlaps these graphs, only the Book table remains and the only attribute of interests is the TITLE Attribute. There are no non-join predicates for this table group, so step 254 does no filtering. As a result the PIR value calculated in 255 is less than preset threshold and OT_ATT=1 so control again transfers from step 258 to step 260.

As there are no non-join predicates associated with the vertical columns, the result identifies each title in the Book table. In this case the analysis in step 261 selects Option 3 whereby the Book:Title vertical column is scanned. Once executed, the resultset from this scan will include all the book titles and hence produce an intermediate resultset of all the books.

When all the table groups have been processed, step 245 passes control to subroutine 246 that provides a final resultset by means of the join/process procedure 246 to analyze the collected data and complete the query plan.

Figure 14C:
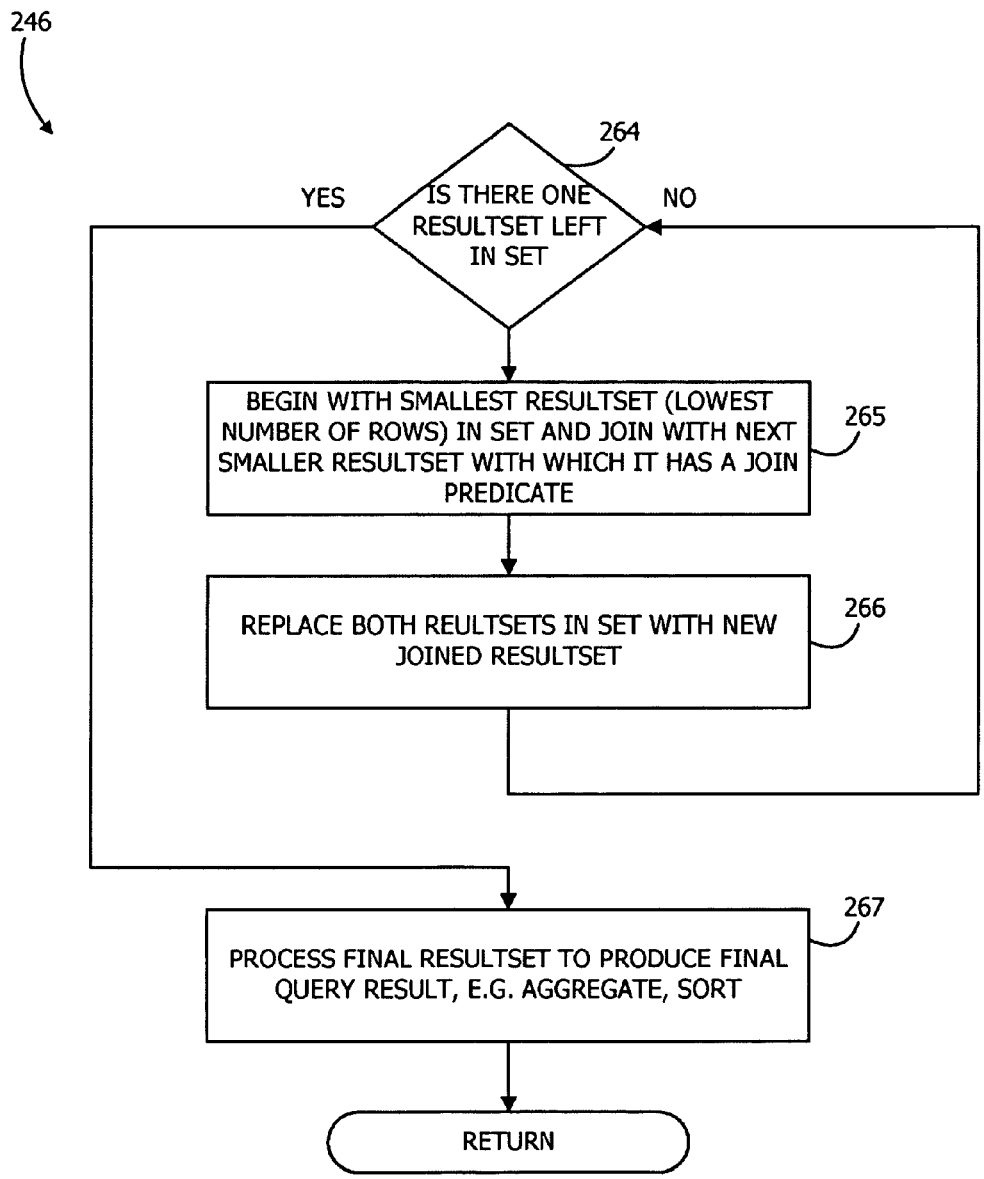

Referring to FIG. 14C, step 264 determines whether more than one resultset is left in the set that has been generated by the procedure of FIG. 14B. If two or more resultsets are left, step 264 transfers to step 265 that selects the smallest remaining resultset; that is, the resultset with the fewest number of rows. Step 267 executes a join with the next smaller resultset to which it has a join predicate. The combined resultset replaces the joined resultsets. When there is only one resultset left, final processing operations, e.g. sort, aggregate, are performed to complete the query.

With specific respect to the query in FIG. 3A, the smallest resultset is the resultset for the Customer table group because the query identifies a specific customer. Processing this information is equivalent to steps 271 and 272 in FIG. 15A. The intermediate resultset will identify the specific customer, each order that customer has placed and for each order the item or items that have been purchased as shown by resultset 272A with one row for each item and columns for all the attributes from the Customer table 36, the Order table 37 and the Item table 40 including the fkBOOKID foreign key. The next resultset that results from joining the resultset 272A with the book title resultset 273A from step 273 is a join operation 274 that produces a resultset 274A. Step 275 produces a projection 275A that contains all the attributes in the SELECT clause. The results are displayed by step 276.

Figure 3B:
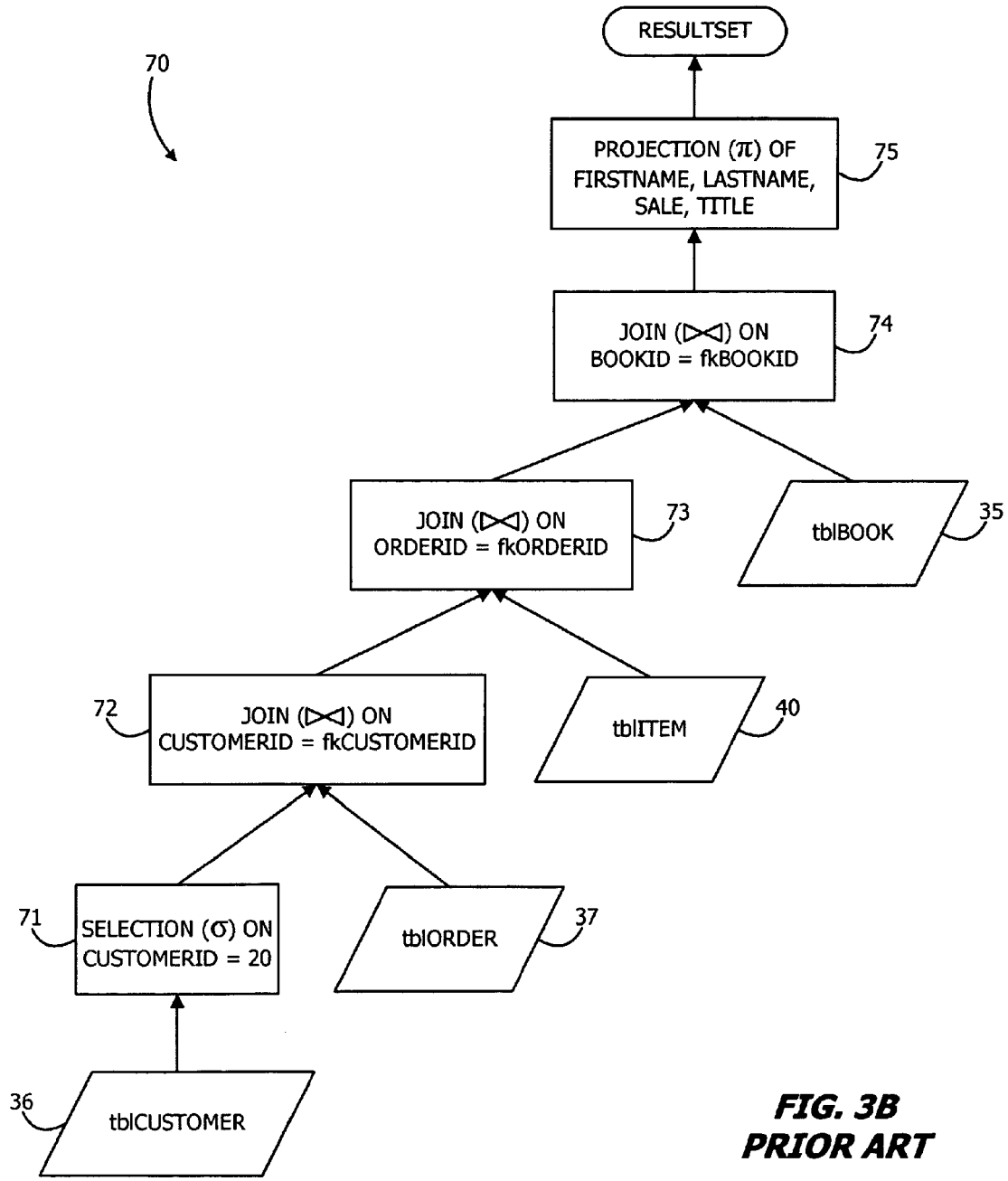
FIG. 3B depicts a query plan by which a prior art system interprets that command.
Figure 15A:
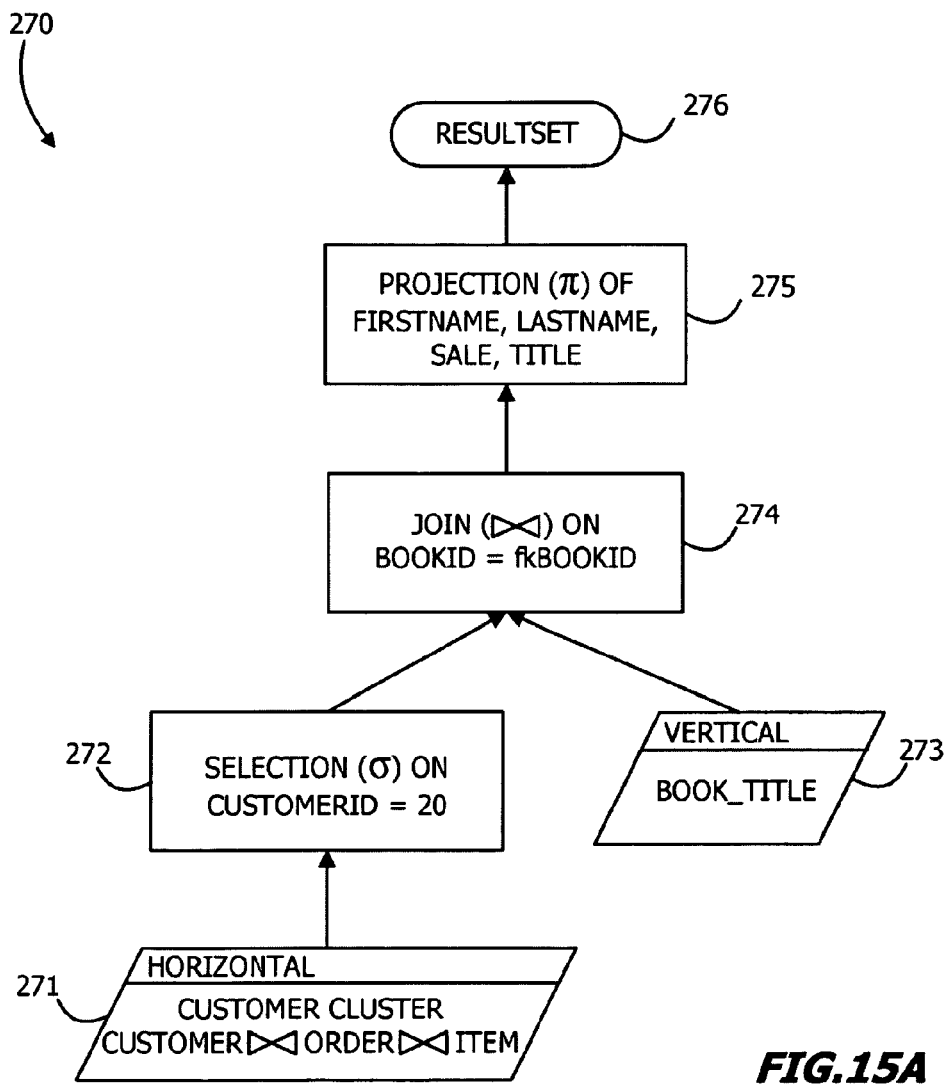
FIG. 15A depicts a query plan developed by the method of FIG. 14 for the query of FIG. 3A.
Figure 16:
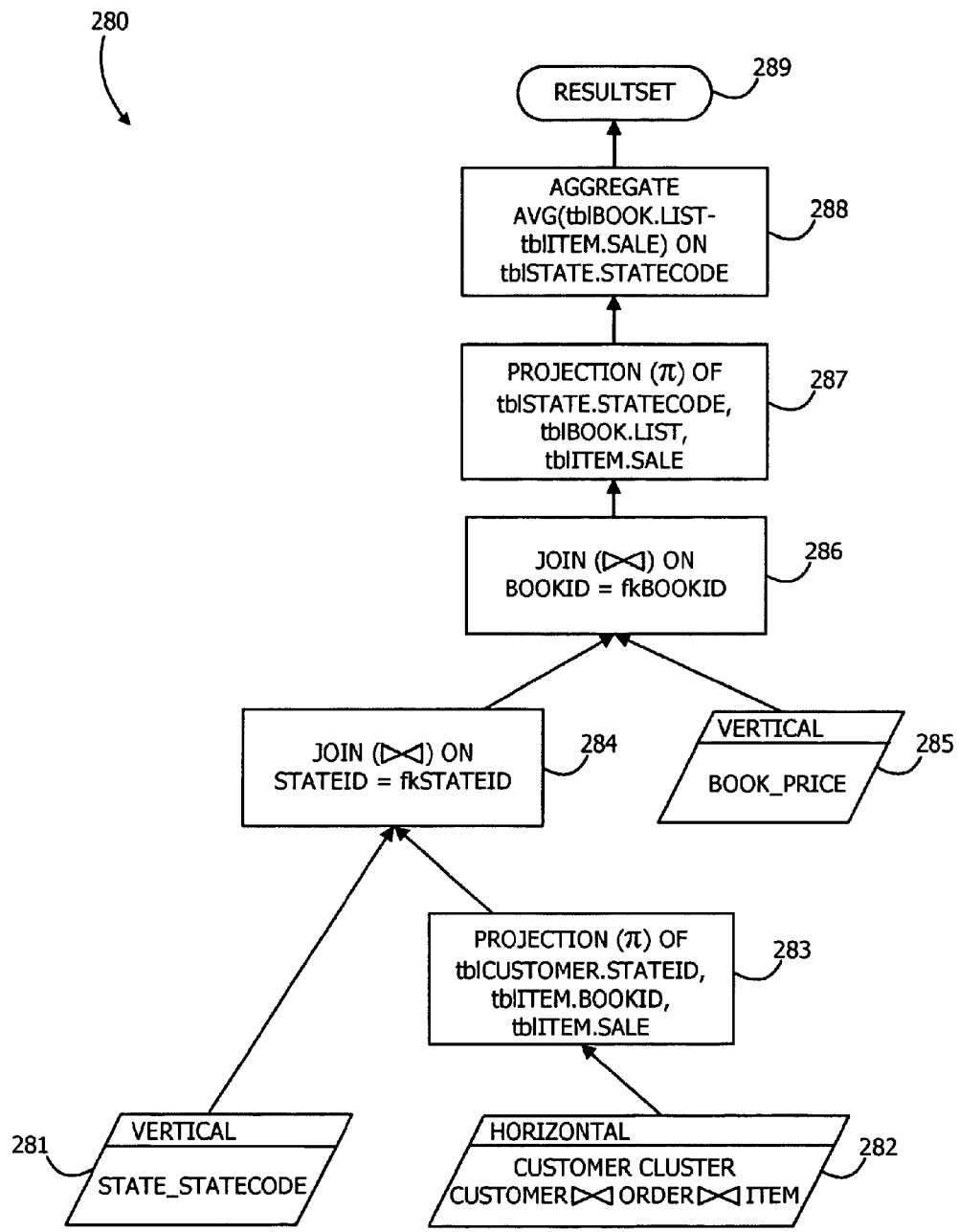
FIG. 16 depicts a query plan developed by the method of FIG. 14 for the query of FIG. 5A.

The advantages of this system can be appreciated by comparing the query plans of FIGS. 3B and 15A. With this invention, initial step 271 includes all the clusters in the Customer container. Selection of the value with CustomerID=20 in step 272 by Option 4 provides the first interim resultset 272A. No join operations have occurred, whereas in FIG. 3B two joins are required to produce a comparable resultset. The join 274 is executed as in the corresponding join in step 74 in FIG. 3B to produce a second interim resultset 274A, except that only the required TITLE column is processed rather than the full Book table. As mentioned before the RID values for the Book table are equivalent to the primary key BOOKID. Therefore, because the order of the Book:Title in the column container corresponds to the RID values, it can logically be considered a two column table, where the first column is the BOOKID attribute and the second the TITLE attribute. As the fkBOOKID value in each row in the first interim resultset 272A corresponds to the primary key in the Book table, the system executes a conventional join based upon the linkage between the fkBOOKID field in each item with a BOOKID primary key in the Book table. More specifically, the join operation 274 obtains the fkBOOKID value from each row in the first interim resultset 272A, and accesses the book data 273A for that BOOKID value to provide the corresponding TITLE.

However, the join operation in step 274 processes only the TITLE attribute column 273 from the book table, rather then having to extract the TITLE attribute from the full book table 35 including all five other attributes, as in step 74 in FIG. 3B. Only a fifth of the data volume is thus processed, thereby reducing costs by reducing data transfer times as well as random accesses thereby permitting faster operation. As will be apparent after comparing FIGS. 3C and 15B, this invention has reduced the number of resultsets from five to three because the three joins required by the query plan in FIG. 3B reduce to one join operation in the query plan of FIG. 15A.

The query in FIG. 5A follows a similar path with respect to FIG. 14. Step 241 identifies all three table groups involved in the query, namely the Customer-Order-Item table group, the Author-Book table group and the State table group. Assuming step 242 selects the Customer-Group-Item table group first, the graphs of steps 250 and 251 again will be identical thereby identifying the Customer table, the Order table and the Item table to be overlapped. Referring to FIG. 14B, the attributes selected in the query are the Customer ID and the fkSTATEID field. As there are no non-join predicates, no filtering occurs. So in the first iteration step 253 extracts a list of seven attributes, namely:

(1) tblITEM.SALE,
(2) tblCUSTOMER.CUSTOMERID,
(3) tblORDER.fkCUSTOMERID
(4) tblITEM.fkBOOKID
(5) tblORDER.ORDERID
(6) tblITEM.fkORDERID
(7) tblCUSTOMER.fkSTATEId Thus (2) and (5) are attributes used as RID values, and there are 5 of the attributes in the table group that are not used as an RID, so PIR=1*5/11, a PIR value that generally will be greater than the threshold. Step 258 diverts to step 259 that elects the second option to generate the customer-order-item table group resultset using a sequential scan of the customer horizontal container.

In the next iteration step 242 selects the author book table group and again defines the Book table as being the only table of interest. Then step 253 extracts a list comprising tlbBOOK.BOOKID and tblBOOK.LIST so there is only one non-primary key attribute not used as an RID, so PIR=1*1/9.

On the third iteration step 242 selects the State table. Step 253 extracts the list of two attributes, namely: the tblSTATE.STATECODE and tblSTATE.STATEID attributes. In this case, PIR=1*1/2.

With no selectivity, PIR values for each of the analyses is 0.5 for the State table group analysis, 0.11 for the Customer table group and 0.45 for the Author table group. Assuming the threshold is set at about 0.4 analysis of the customer-order-item group produces a resultset with values for the CUSTOMERID, fkCUSTOMERID, ORDERID, fkBOOKID AND fkSTATEID attributes. This resultset will have a number of rows equaling the total number of items in the Item table.

The PIR value for the Author table group is less then the threshold and step 260 has no impact as no non-join predicates are associated with the Book table, therefore step 261 selects Option 3 by identifying a scan of the vertical column container for LIST price attribute each of which will again identify all the books in the Book table. Similarly, the state code resultset will be computed from the vertical column container for the STATECODE attribute, which will logically include the values for the STATEID and STATECODE and will contain one row for each state.

FIG. 16 depicts a query plan 280 for the query in FIG. 5A developed in accordance with this invention. Step 281 produces a result set from the tblSTATE.STATECODE vertical container. Step 282 represents the scanning of all the clusters in the Customer-Order-Item container that produces a resultset 283 that includes the fkSTATEID attribute from the Customer table, the fkBOOKID attribute from the Item table and the SALE attribute from the Item table. A join operation 284 produces a resultset in which each row of the projection of step 283 includes a state code.

Next, the system uses step 285 to retrieve the tblBOOK.LIST vertical container with its implicit BOOKID attribute. Step 286 joins with the fkBOOKID attribute of the Item table in the intermediary resultset of step 284. Step 287 converts the resultset to one including the state code, price and sale attributes. Step 288, like step 88 in FIG. 5B, provides the aggregate based on the state code and generates the results of step 289.

Figure 5B:
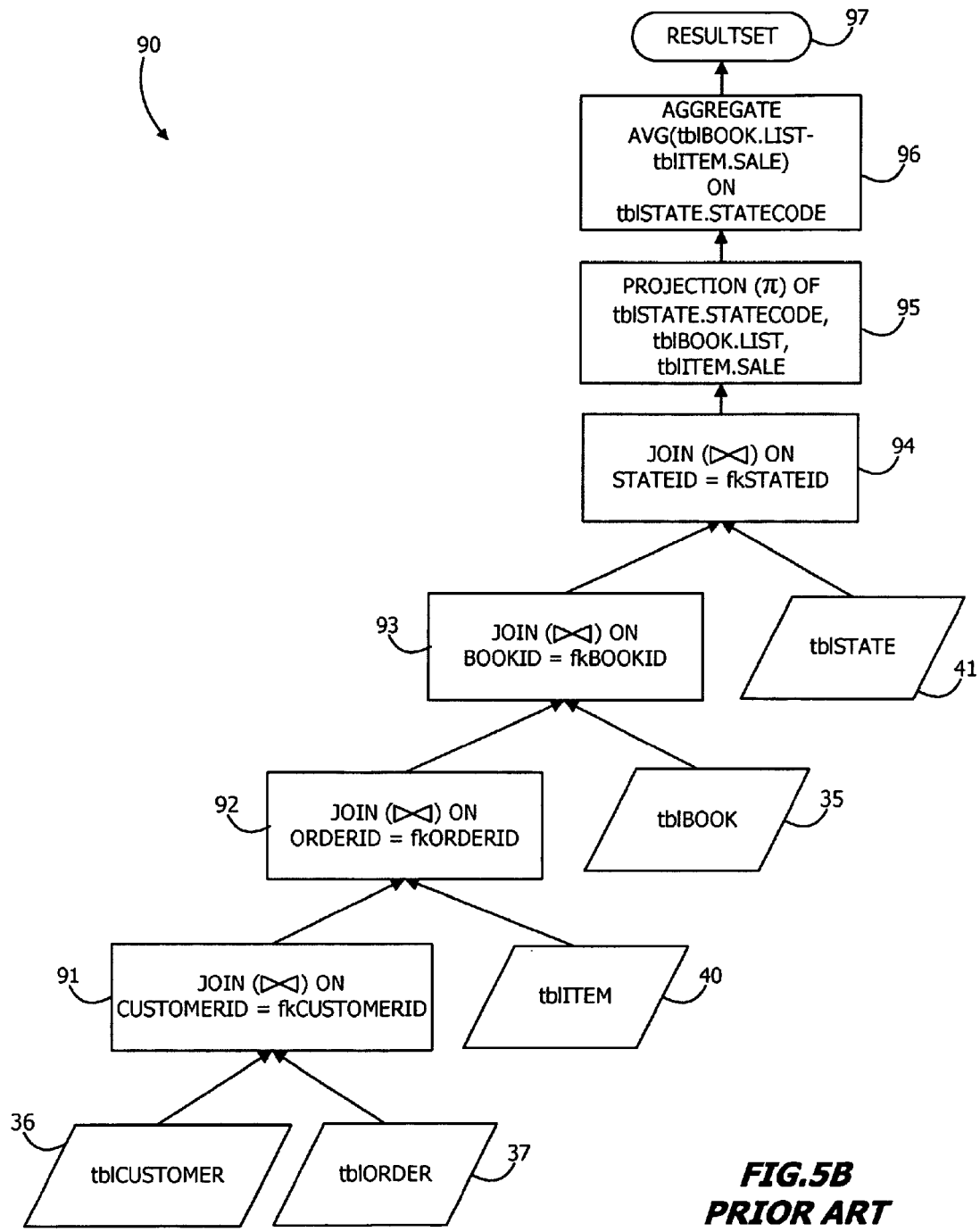
FIG. 5B depicts a prior art query plan for the SQL query of FIG. 5A.

As a comparison, processing the query shown in FIG. 5A using the prior art methods of FIG. 5B requires four join operations. In accordance with this invention and as shown in FIG. 16, this number is reduced to two join operations that are further enhanced by the use of column containers where appropriate to minimize the volume of data fetched and the number of random accesses.

These examples allow an understanding of the advantage in using multiple data store units. Prior art methods retrieve rows of a table structure or filter a column using a predicate. However, join operations must still be performed. In order to filter a column that is not indexed a full table needs to be scanned. A system including this invention stores multiple copies of the data. In this specific example one copy in a horizontal data store unit stores related rows clustered together thereby eliminating inner-table-group join costs and random accesses to the different rows. It is possible to store columns sequentially in the second data store unit making the retrieval of specific columns highly efficient. These approaches combine in a unit, such as a cluster as much related data as possible for any action by a query to optimize the query processing. As the size of the data, complexity of data model, and intricacy of queries increase, the advantages inherent in this design allow progressively more efficient implementations.

Database Updates

Figure 17:
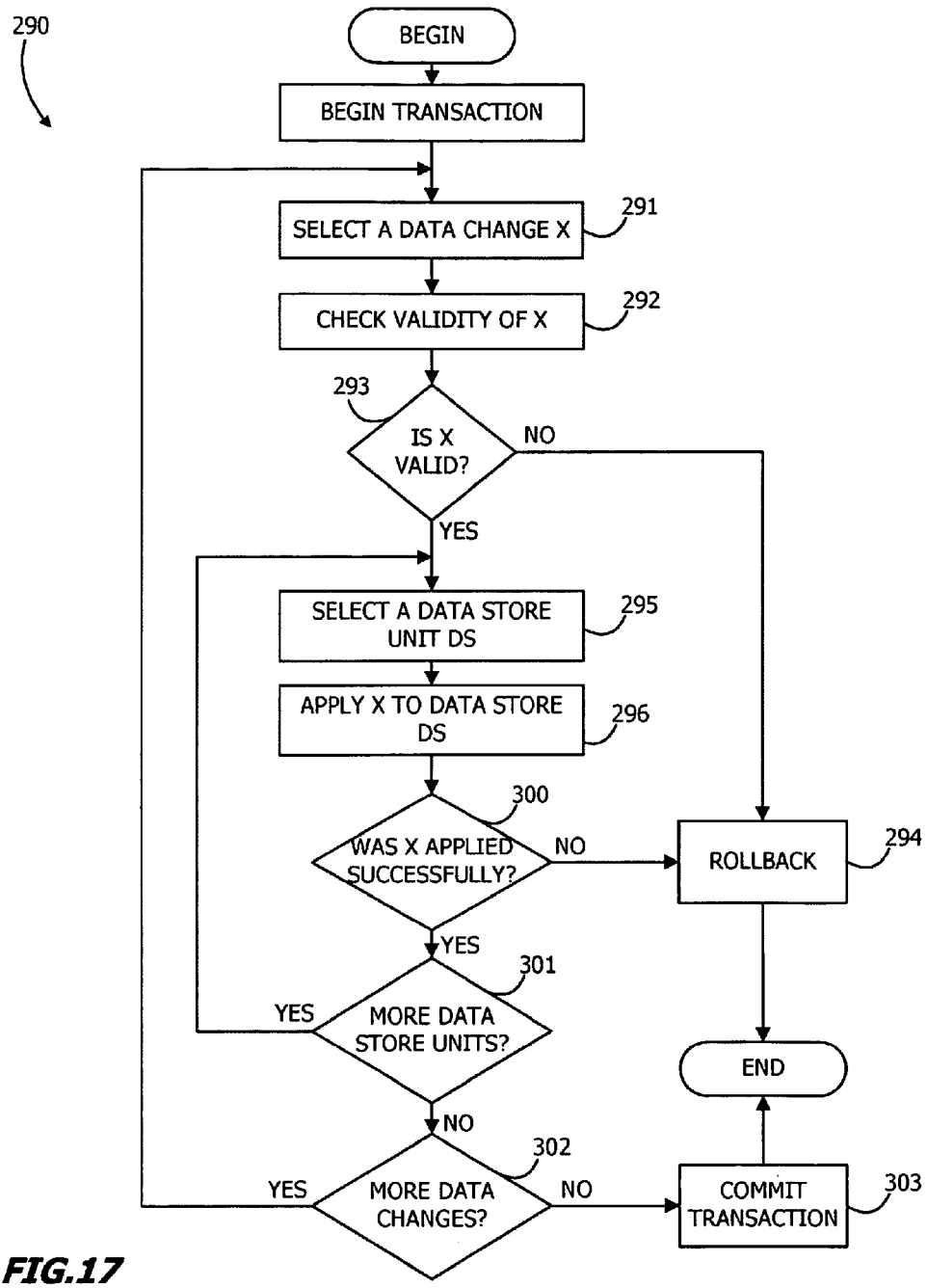
FIG. 17 is a flow chart for a updating a database.

This invention uses a straight-forward method for updating the database in a response to an update event. As shown in FIG. 17 a routine 290 processes each update event. Initially data associated with each update query is stored in the change log 105 in FIG. 6. Step 291 retrieves a change log entry that requires a data change and is designated as "data change x". Step 292 checks its validity. Step 293 determines whether the change is valid. If it is not, control transfers to a roll back routine 284 that terminates any further updates.

If the data change is valid, step 293 transfers to step 295 to select either the first dimension data store unit 106 or the second dimension data store unit 107. Step 296 applies the data change to the selected data store unit. The process again is similar to that in the prior art except the step 296 varies depending upon the data store selected. That is, if the first dimension data store 106 is selected and this represents new data, such as a new customer, step 296 must form the cluster for that customer including the customer order item and any item entries.

If the change is not applied successfully, step 300 transfers control to the roll back routine 294. If it is successful, step 301 determines whether any additional data store units are to be updated. Thus, if this is the end of the first iteration of the loop comprising steps 295 through 301, control transfers back to step 295 to select the second dimension data store unit 107. In this case the data is applied by being added to the end of each appropriate column container. Again, if the change to the second dimension data store unit 107 is successful, step 300 transfers back to step 301.

If this is the second iteration, step 301 transfers control to step 302 to determine whether any additional changes remain in the data change log 105. Once all the data changes have been successfully completed, step 303 commits changes and terminates the process 290.

XML Schema

A database system incorporating this invention is easily adapted for the storage and retrieval of XML data, and in particular to XML data that is based on a known XML data model, also known as an XML Schema or XSD. FIG. 18 discloses such an XML Schema for the customer-order-item table group 165 in FIG. 9. As will become apparent, the XML schema defines all the information associated with the customer, including attributes, orders, and items, and may be directly extracted from the data dictionary 102 in FIG. 9 with no mapping necessary.

A "Customer Container" element 310, corresponding to the container 110 in FIG. 7 is followed by a customer element 313, an order element 315 and an item element 317 corresponding to the customer table 36D, order table 37D and item table 40D in FIG. 9 respectively along with their respective attributes. The order of elements in the XML schema follows that defined in the data dictionary 102 in FIG. 9 using root tables and defining relationships. More specifically, the system identifies and establishes the structure by including a reference to the Customer table at 313. This is followed by a series of element name operations 314, and 319 to define the attributes for the Customer table 36 in FIG. 1. Next the system identifies the Order table at 315 and establishes the various elements 316 corresponding to the attributes for the Order table 37 in FIG. 1. Following statements 317 define the Item table and its attributes 318. As will be apparent to those skilled in the art, the XML Schema in FIG. 18 is readily adapted to handle, in whole or in part, any changes in relationships, the addition, deletion or modification of tables and the addition deletion or modification of attributes.

FIG. 19 depicts a sample of the data in FIG. 2 for the customer-order-item table group according to the XML schema of FIG. 18. Specifically, FIG. 19 discloses such XML data 194A that corresponds to the horizontal cluster for ADAM APPLE 194 in FIG. 12 as shown in detail in FIGS. 12B-1 and 12B-2. A block 200A corresponds to cluster row 200 in cluster 194 that contains customer data; in this case the customer is Adam Apple. Following that is another block 201A that identifies an order, corresponding to cluster row 201. Blocks 203A and 204A identify two items that belong to the order in 201A.

In this case, and as shown in FIG. 12, Adam Apple has two orders. Therefore block 202A identifies the second order and block 205A identifies the single item related to this second order. The XML data for the Customer cluster Bonnie Bird 195A, which corresponds to the Cluster 195, follows, and is shown by reference only. Thus the XML data in FIG. 19 is equivalent to the data in the container 110 containing all customer clusters. Similarly, other table groups are represented using XML Schema and XML data documents derived from the information in the data dictionary 150 and the data in the horizontal containers.

Conversely, given an XML schema, the corresponding data model 150 and data structures for the data store units can be constructed. In such a case the step 153 in FIG. 10A becomes redundant as the grouping hierarchy is pre-defined as part of the XML schema. Therefore the algorithm in FIG. 10B, traced in FIGS. 11A-E, would not be required. An XML schema defines a structure that can be directly defined in clusters. Therefore, XML data can be loaded directly into the clusters as they contain equivalent structures. At runtime, XML queries posed to the system are processed internally using the methodologies developed for SQL queries, and using both data store units, and the results returned as XML data.

In summary, a database management system constructed in accordance with this invention is compatible with conventional logical table diagrams organized with columns that define attributes and rows that store values, links between related primary and foreign keys and queries, typically SQL queries as shown, for example, in FIG. 1. The database management system processes each query to transfer data to or from the different storage units as shown, for example, in FIG. 6. A first storage unit stores the complete database according to a first schema; the second, a second schema. Thus, in accordance the objectives of this invention, the database has redundant copies of the database, albeit in accordance with different schema.

Transferring data with the first storage unit includes the converting the logical tables in the model, like the diagram shown in FIG. 1, into table groups. Each table group will include a root table and an array of other logical tables linked directly or indirectly to the root table as shown, for example, in FIGS. 10B and 11A through 11E. The first storage unit stores the data according to one usage pattern in a container as shown, for example, in FIG. 7. Each container includes at least one identified cluster for each row in the corresponding root table and all the rows of the array of tables that are joined directly or indirectly to the root table for that table group. Data in each cluster includes one or more cluster rows that store the data from the row of the root logical table and all the data from the other logical tables in the table group that are linked to the data in the root table row. The second storage unit stores data according to a second usage pattern in a plurality of column containers as shown, for example, in FIG. 8. There is one column container for each combination of a table and one of its attributes.

The data in each cluster row is stored sequentially in the first storage unit and the attribute values in each column container for the corresponding column in a logical table are stored sequentially. Sequentially storing data according to schemata, such as those disclosed herein, provides two advantages. The data in the first storage unit is optimized for transferring data based upon a first usage pattern represented by OLTP queries, particularly where access will be limited to a single row or limited number of rows in the root table. The data in the second storage unit is optimized for transferring data based upon a second usage pattern as associated with OLAP queries that normally select only a few columns. Storing data sequentially, rather than randomly, improves throughput because selected data can be retrieved sequentially.

The database management system also includes a plurality of procedures for retrieving a resultset as shown, for example, in FIGS. 14 through 14C. A control selects one of a plurality of procedures that maximizes the receipt of the resultset based upon the requested information for each table group and the estimated proportion of the table group that will be accessed. This improves throughput by minimizing the time required to process a query to obtain a final resultset. Of all the join operations represented in the logical database, only the joins between resultsets for each table group are required. This greatly reduces the number of join operations and further improves response times and throughput.

Other features of this invention provide additional throughput advantages. For example, the exact sequence as would be represented in a query plan is determined dynamically during the processing of the query. As shown in FIG. 14B, processing to obtain resultsets begins immediately upon completion of the analysis for each table group. As shown in FIG. 14C, returned intermediate resultsets are ordered by size. This optimizes the execution of those joins that establish relationships with different table groups.

The database management system also is adapted to handle highly complex logical database representations and is adapted to interface with standard query languages, such as SQL queries. In addition and as shown in FIGS. 18 and 19, the system also interfaces with XML to define the data structures and data changes.

This invention has been disclosed in terms of certain embodiments. It will be apparent that many modifications can be made to the disclosed apparatus without departing from the invention. For example, the disclosure describes the data structures for two specific storage units. This invention is equally applicable to other data structures. As will apparent to those skilled in the art, the response to an event that requires a change in the data structure for each or both of the storage units can be modified. The disclosure of the response to an SQL query can be modified to provide different internal processing and changes in the sequence in which the individual queries are processed and in the modification of retrieval options by addition, deletion or modification of one or more options.

What is claimed as new and desired to be secured by Letters Patent of the United States is:

1. A method, comprising:
    forming at least one table group from different tables included in a logical database, wherein the at least one table group:
        comprises a root table and one or more related tables, and
        defines a physical storage structure in a memory unit adapted to maintain data objects from the root table and the one or more related tables, wherein the data objects are co-located and stored consecutively within the memory unit in accordance with the physical storage structure;
    aggregating the data objects from the root table and the one or more related tables to form a composite entity;
    storing the composite entity in the memory unit in accordance with the physical storage structure; and
    responsive to a query, sequentially accessing and providing the data objects from the root table and the one or more related tables in accordance with the composite entity.

2. The method of claim 1, wherein the composite entity conforms to a structured interchange data format.

3. The method of claim 2, wherein the structured interchange format is Extensible Markup Language (XML).

4. The method of claim 1, wherein the data objects are XML objects that conform to an XML schema.

5. The method of claim 4, wherein the at least one table group is formed based on the XML schema.

6. The method of claim 1, wherein the query is an XML query.

7. A non-transitory computer readable storage medium configured to store instructions that, when executed by a processor included in a computing device, cause the processor to carry out steps that include:
    forming at least one table group from different tables included in a logical database, wherein the at least one table group:
        comprises a root table and one or more related tables, and
        defines a physical storage structure in a memory unit adapted to maintain data objects from the root table and the one or more related tables, wherein the data objects are co-located and stored consecutively within the memory unit in accordance with the physical storage structure;
    aggregating the data objects from the root table and the one or more related tables to form a composite entity;
    storing the composite entity in the memory unit in accordance with the physical storage structure; and
    responsive to a query, sequentially accessing and providing the data objects from the root table and the one or more related tables in accordance with the composite entity.

8. The non-transitory computer readable storage medium of claim 7, wherein the composite entity conforms to a structured interchange data format.

9. The non-transitory computer readable storage medium of claim 8, wherein the structured interchange format is Extensible Markup Language (XML).

10. The non-transitory computer readable storage medium of claim 7, wherein the data objects are XML objects that conform to an XML schema.

11. The non-transitory computer readable storage medium of claim 10, wherein the at least one table group is formed based on the XML schema.

12. The non-transitory computer readable storage medium of claim 7, wherein the query is an XML query.

13. A computing device, comprising:
a processor configured to cause the computing device to carry out steps that include:
forming at least one table group from different tables included in a logical database, wherein the at least one table group:
comprises a root table and one or more related tables, and
defines a physical storage structure in a memory unit adapted to maintain data objects from the root table and the one or more related tables, wherein the data objects are co-located and stored consecutively within the memory unit in accordance with the physical storage structure;
aggregating the data objects from the root table and the one or more related tables to form a composite entity;
storing the composite entity in the memory unit in accordance with the physical storage structure; and
responsive to a query, sequentially accessing and providing the data objects from the root table and the one or more related tables in accordance with the composite entity.

14. The computing device of claim 13, wherein the composite entity conforms to a structured interchange data format.

15. The computing device of claim 14, wherein the structured interchange format is Extensible Markup Language (XML).

16. The computing device of claim 13, wherein the data objects are XML objects that conform to an XML schema.

17. The computing device of claim 16, wherein the at least one table group is formed based on the XML schema.

* * * * *